(12) United States Patent
Guest et al.

(10) Patent No.: US 9,037,725 B2
(45) Date of Patent: May 19, 2015

(54) ONLINE GAME SYSTEM, METHOD, AND COMPUTER-READABLE MEDIUM

(71) Applicant: Bigpoint Inc., San Francisco, CA (US)

(72) Inventors: Scott Guest, San Rafael, CA (US); Martin Brownlow, Pikeville, NC (US)

(73) Assignee: BIGPOINT INC., San Francisco, CA (US)

( * ) Notice: Subject to any disclaimer, the term of this patent is extended or adjusted under 35 U.S.C. 154(b) by 215 days.

(21) Appl. No.: 13/654,677

(22) Filed: Oct. 18, 2012

(65) Prior Publication Data

US 2014/0115144 A1    Apr. 24, 2014

(51) Int. Cl.
*G06F 15/173* (2006.01)
*H04L 12/26* (2006.01)
*H04L 12/911* (2013.01)
*H04L 29/06* (2006.01)
*A63F 13/30* (2014.01)
*H04L 29/08* (2006.01)

(52) U.S. Cl.
CPC ............ *H04L 43/0805* (2013.01); *H04L 47/70* (2013.01); *A63F 13/12* (2013.01); *H04L 29/08072* (2013.01); *H04L 67/10* (2013.01); *H04L 67/38* (2013.01)

(58) Field of Classification Search
USPC .................... 709/224, 226; 463/42; 718/104; 714/6.12, 6.22
See application file for complete search history.

(56) References Cited

U.S. PATENT DOCUMENTS

| | | | |
|---|---|---|---|
| 7,517,282 B1 | 4/2009 | Pryor | |
| 2003/0177187 A1 | 9/2003 | Levine et al. | |
| 2005/0240805 A1* | 10/2005 | Schnapp et al. | 714/6 |
| 2006/0143502 A1* | 6/2006 | Chawla et al. | 714/6 |
| 2007/0293319 A1* | 12/2007 | Stamper et al. | 463/42 |
| 2012/0137007 A1* | 5/2012 | Schanen | 709/226 |
| 2013/0179894 A1* | 7/2013 | Calder et al. | 718/104 |

* cited by examiner

*Primary Examiner* — Kyung H Shin
(74) *Attorney, Agent, or Firm* — Sutherland Asbill & Brennan LLP

(57) ABSTRACT

Certain embodiments herein are directed to an online game system, computer-readable medium, and a method comprising: providing a network system comprising a central device and a plurality of remote devices, each said remote device being connected to the central device; providing a plurality of data objects in the network system; and, for running an online game session in the network system, implementing a mode of operation, comprising: assigning each of said data objects to at least one of the remote devices, thereby, giving the at least one remote device control over the assigned data object, and excluding the central device from control over each of said data objects; and, for the plurality of remote devices, limiting data object related game data exchange to a direct data exchange with the central device only.

16 Claims, 24 Drawing Sheets

ONLINE GAME SYSTEM, METHOD, AND COMPUTER-READABLE MEDIUM

TECHNICAL FIELD

The present disclosure refers to technologies in the field of online game systems.

BACKGROUND

Existing networking architectures for real-time (e.g. online) computer games have strengths and weaknesses.

A common architecture for networked computer games is client-server. In this architecture, players using a client device may each attach to a single node (server device). This server device may then authoritatively control all data objects or game objects related to an online game. The server device may send network packets to each client device to communicate changes in these data objects and their relationships with each other. When a client device wants to perform an action, it may communicate a request to perform the action to the server, which may then decide whether or not the action is valid, carry out the action, and communicate the relevant results back to interested clients. In this architecture, the server device may bear the brunt of all game logic.

In a client-server game, cheating may be difficult to accomplish, since one or more actions must be validated and carried out by the server device. For example, a client device implemented on a local computer of the user may not give his avatar more health or teleport around the world by hacking a value in memory.

Currently, the complexity of an online browser game may be limited due to reliance on the client-server architecture and the fact that server processing time may be relatively expensive. As online games get more complex, the amount of logic that needs to run on the server device may increase. This may cause the number of players that can be accommodated per server to drop (since each player requires more processing and the server has limited processing power), raising the cost of running the game.

A second known architecture used for online gaming is peer-to-peer." In a peer-to-peer architecture, each player (peer) may connect to at least one other player. Each peer implemented by a local client device may be authoritative over at least a subset of the data objects relating to the game. When a player wishes to interact with a data object owned by another peer, the player must communicate the player's intents over the network. The owner may then decide if the request is valid, process the request, and send the relevant results to interested client devices. This architecture distributes game logic amongst the peers, but each peer may now be required to send much more data over the network (since it must talk and send updates to every other peer). There may also be problems with this architecture when peers disconnect, such as determining who will assume ownership of the objects owned by the disconnecting peer, who has the most up-to-date copy of the state of these objects, etc.

Since each peer may be authoritative over a subset of the data objects, a player can easily hack any data object that he has ownership of (which usually includes his own avatar). This makes peer-to-peer games an unpopular choice for online games on insecure platforms such as a personal computer.

BRIEF SUMMARY

In an online game system, a method is provided comprising providing a network system comprising a central device and a plurality of remote devices, each said remote device being connected to the central device. A plurality of data objects may be provided in the network system. For running an online game session in the network system, a mode of operation may be implemented, comprising, for each of said data objects, assigning ownership of the data object to at least one of the remote devices by giving said at least one remote device control over the data object and by excluding the central device and at least one other remote device of the plurality of remote devices from control over the data object. Ownership of the data object may be migrated from said at least one remote device to said at least one other remote device by giving said at least one other remote device control over the data object, and by excluding the central device and said at least one remote device from control over the data object.

Also, an online game system may be provided, comprising a network system, a central device provided in the network system, a plurality of remote devices provided in the network system, each said remote device being connected to the central device, and a plurality of data objects provided in the network system. The network system, for running an online game session, may be configured to implement a mode of operation comprising, for each of said data objects, assigning ownership of the data object to at least one of the remote devices by giving said at least one remote device control over the data object, and excluding the central device and at least one other remote device from the plurality of remote devices from control over the data object, and migrating ownership of the data object from said at least one remote device to said at least one other remote device by giving said at least one other remote device control over the data object, and excluding the central device and said at least one remote device from control over the data object.

According to another aspect, a computer-readable medium including a computer program for running an online game session in a network system is provided, including a central device, a plurality of remote devices, each said remote device being connected to the central device, and a plurality of data objects. The computer-readable medium comprises: means recorded on an electronic data storage medium for implementing a mode of operation; means recorded on the electronic data storage medium for assigning ownership of the data object to at least one of the remote devices for each of said data objects, by giving said at least one remote device control over the data object, and excluding the central device and at least one other remote device from the plurality of remote devices from control over the data object; and means recorded on the electronic data storage medium for migrating ownership of the data object from said at least one remote device to said at least one other remote device by giving said at least one other remote device control over the data object, and excluding the central device and said at least one remote device from control over the data object.

In one embodiment, the computer-readable medium is provided as non-transitory computer-readable medium.

In one embodiment, migrating the ownership of the data object may further comprise providing a request message to said at least one other remote device indicating that the at least one other remote device shall be assigned ownership of the data object; and, by said at least one other remote device, responding with an answer message indicating that it will take over ownership of the data object.

In one embodiment, migrating the ownership of the data object may further comprise detecting a failure to respond to one or more messages by said at least one remote device.

In one example, migrating the ownership of the data object may further comprise detecting a disconnection of said at least one remote device from the network system. The game logic may be performed on the remote devices of the system, in one embodiment. When a remote device stops responding to messages, it is possible that the remote device is either disconnecting or that network congestion is occurring, as non-limiting examples. The result of the disconnection may be that, to other players, certain data objects in the online game may stop responding. It may be desirable, then, to detect when a remote device stops responding, and take action. A simple action may be to disconnect the player and redistribute his data objects via migration. When the central device detects that a remote device (e.g., a player) is not responding in a timely manner, it may preemptively start migration of the client device's data objects to other, more responsive, remote devices. This may be used to maintain the responsiveness of data objects for other remote devices by detecting the problem quickly, whilst giving the connection to the remote device time to settle. If after a short time the remote device still has not responded, then the remote device may be dropped from the game.

According to a further example, migrating the ownership of the data object may further comprise searching, in the central device, cached information about a current status of the data object. With the online game system proposed herein, the central device may maintain a cached copy of the current state of every data object by virtue of the fact that all network traffic may be required to pass through it. When a remote device disconnects, the central device may iterate through all the objects owned by the disconnected remote device, and may migrate them to a selected remote device using its cached state, preferably by a forced migration action. This may allow remote device disconnects to be resolved relatively quickly and authoritatively.

In still a further example, migrating the ownership of the data may be performed as part of a load balancing process balancing an individual data object load for the plurality of remote devices. In this example, load balancing may be a possible migration task. For example, the data objects may spread out as evenly as possible amongst the remote devices in the online game, spreading the game logic burden amongst multiple nodes. In this way, a load balancing migration may be considered as a cooperative migration.

According to an example, migrating the ownership of the data may be performed as part of a latency optimization process reducing latency in data communication between data objects. Latency reduction may attempt to place data objects that may interact with each other on the same remote device. This may reduce the latency in their communications, and may result in a faster, more responsive experience. The probability of two data objects interacting, for example, may be determined by the observers that are declared by the game to the system. As used herein, an observer may refer to remotely owned objects that define which data objects may be replicated on a player's device. In one embodiment, the objects that are replicated on the player's device may be determined by the observer to be interesting to the player. A player's avatar, for example, may be defined as an observer. In this way, a latency reduction migration may be considered as a cooperative migration.

In another example, a method may further comprise migrating ownership of another data object having online game-related data communication with the data object to said at least one other remote device by giving said at least one other remote device control over the other data object, and excluding the central device and at least the remote device from control over the other data object.

According to an aspect, migrating the ownership of the data object may be performed by a cooperative migration process comprising, by the central device, requesting said at least one remote device to relinquish control over the data object; and receiving a response to the request from said at least one remote device a the central device, the response indicating one of said at least one remote device agrees to relinquish control over the data object or said at least one remote device declines to relinquish control over the data object.

In one example, migrating the ownership of the data object may be performed by a forced migration process comprising informing said at least one remote device of revocation of control over the data object by the central device.

With respect to the online game system and the computer-readable medium, respectively, the embodiments outlined above and others may be applied accordingly.

According to one aspect of the present disclosure, in an online game system, a method is provided, comprising: providing a network system comprising a central device and a plurality of remote devices, each remote device being connected to the central device; providing a plurality of data objects in the network system; and, for running an online game session in the network system, implementing a mode of operation comprising: assigning each of said data objects to at least one of the remote devices, thereby giving the at least one remote device control over the assigned data object, and excluding the central device from control over each of said data objects; and for the plurality of remote devices, limiting data object-related game data exchange to a direct data exchange with the central device only.

An online game system may be provided with a system architecture which may be referred to as arbiter-peer architecture. The system may comprise a central device comprising a software game application running on trusted hardware components. The central device comprising the trusted hardware components and the software game application running on it may also be referred to as an arbiter. A plurality of remote devices may be connected to the central device for data communication. For data communication, for instance, the Internet may be used. In addition or as an alternative, other (e.g. local) network structures may be used for data communication between the central device and the remote devices. Each remote device may comprise one or more software applications or program modules (e.g., a client application) that may be implemented on a mobile device, e.g. a mobile phone, laptop computer, tablet computer, etc. The client application may be provided by a browser, a dedicated application, etc. In an online game session, the client application may be used by the player for connecting to the central device and participating in the online game. The remote device comprising the local hardware components and the software client application running on it may also be referred to as a peer.

Limiting the data object-related game data exchange to a direct data exchange with the central device may exclude any game data object-related game data exchange between the remote devices directly. In this example, all game data exchange may go through the central game device.

By assigning each of said data objects to at least one of the remote devices, each remote device may be given authoritative control (e.g. ownership) over at least a subset of the online game related data objects assigned to the remote device. In this example, the central device may be excluded from control over said data objects.

Each of the remote devices may control at least a subset of the data objects in the online game, and may be in charge of game logic related to these data objects. In this example, all game logic may be in the remote game devices.

A further aspect of the disclosure associated with implementing the mode of operation may further comprise storing a copy of each of the data objects in the central device.

In one embodiment, implementing the mode of operation may further comprise maintaining, in the central device, a list of all remote devices connected to the running game session.

In another embodiment, implementing the mode of operation may further comprise maintaining, in the central device, a list of all data objects owned by each remote device.

In yet another embodiment, implementing the mode of operation may further comprise maintaining, in the central device, a list of all data objects interesting to each remote device. An interesting data object may be a data object which the remote device may need to interact with in an online game session, or alternatively may depend on for communications, data, or other information in the online game session.

Implementing the mode of operation may further comprise providing a network library, the network library comprising two channels of data communication, namely a first channel of data communication being reliable, and in-order, and a second of data communication being unreliable and sequenced. With respect to the first channel of data communication, any message sent on the first channel may be guaranteed to arrive at the destination (e.g., the central device or remote device) in the order it was sent. With respect to the second channel of data communication, messages sent on the second channel may not be guaranteed to arrive at the destination, but if they do arrive, they will arrive in order, in one embodiment.

Another aspect of the disclosure may be directed to providing the network library, which may comprise providing a network protocol to be used in the online game session and storing the network protocol in the network system. The network protocol may be a schema that completely defines a network state for the online game system. In general, the network or communications protocol may be a system of digital message formats and rules for exchanging messages in or between the devices of the online game system. The protocol may have a formal description. The network protocol may include signaling, authentication error detection, and correction capabilities. The protocol definition may define the syntax, semantics, and synchronization of data communication; the specified behavior is typically independent of how it is to be implemented. A protocol may be implemented as hardware or software, or both. The network protocol of the online game system may describe all the components that may appear in a class, and how the components combine to create a given class.

In a further embodiment, providing the network protocol comprises at least one of the following: performing a code reflection and loading network protocol data from an XML file, or other suitable file type from which protocol data may be retrieved.

In still a further embodiment, a method further comprises determining an encoded value for the network protocol, and if a new remote device is connecting to the central device, checking whether the new remote device is using the network protocol by comparing the encoded value to a present encoded value provided for a network protocol identified for use with the new remote device. Once generated or loaded, an encoded value such as a hash value may be created from the resulting structure, namely the network protocol. The encoded value can be used to check that a remote device connecting to the central device is using the same network protocol.

The subsets of the data objects in the online game may each be controlled by one of the remote devices. Each of the remote devices may be in charge of game logic related to the data objects controlled by the respective remote device. According to this configuration, all or a portion of game logic may be provided by the remote game devices. The term "game logic" as used herein is the application that the data transferred by a network library is used for, i.e. the network library says that a character's health is 0, but this has no meaning until the game logic is applied. In one embodiment, the game logic may comprise things such as, but not limited to, collision, character movement, attacking, defending, playing sounds, displaying graphics, and/or other functions or attributes that make up an online game.

One aspect of the present disclosure which may be combined with one or more other aspects refers to cheat prevention.

According to one aspect of the disclosure, in an online game system, a method is provided comprising providing a network system comprising a central device and a plurality of remote devices, each said remote device being connected to the central device. An online game session may run in the network system. A cheating index may be provided, the cheating index being associated with a remote device from the plurality of remote devices. Online game-related data from the remote device may be received at the central device. In the central device, it may be determined whether cheating, such as, but not limited to, a cheating attack, has happened to the online game-related data received from the remote device. If a cheating attack is determined to have occurred, the cheating index associated with the remote device in the central device may be amended to indicate the cheating attack.

According to another aspect, an online game system is provided comprising a network system comprising a central device and a plurality of remote devices, each said remote device being connected to the central device, the network system being configured to perform the following: running an online game session in the network system; providing a cheating index associated with a remote device from the plurality of remote devices; receiving online game-related data from the remote device in the central device; and in the central device, determining whether cheating, such as a cheating attack, has happened to the online game related data received from the remote device; and if a cheating attack is determined, amending the cheating index associated with the remote device in the central device, the amended cheating index indicating the cheating attack.

According to still another aspect, a computer-readable medium including a computer program for running an online game session in a network system is provided, including a central device, a plurality of remote devices, each said remote device being connected to the central device, and a plurality of data objects. The computer-readable medium comprises: means recorded on an electronic data storage medium for providing a cheating index assigned to a remote device of the plurality of remote devices; means recorded on an electronic data storage medium for receiving online game-related data from the remote device in the central device, means recorded on an electronic data storage medium for determining in the central device whether cheating has happened to the online game-related data received from the remote device, and means recorded on an electronic data storage medium for amending the cheating index assigned to the remote device in the central device if a cheating attack is determined, the amended cheating index indicating the cheating attack.

In one embodiment, the computer-readable medium may be provided as a non-transitory computer-readable medium.

In one embodiment, the method may further comprise providing a first class of attack assigned to a first level of cheating attack; providing a second class of attack assigned to a second level of cheating attack, which may be different from the first level of cheating attack; classifying the cheating attack as being from the first or the second class of attack; and amending the cheating index associated with the remote device in the central device, the amendment of the cheating index indicating whether the cheating attack determined is classified as belonging to the first or second class attack. In one embodiment, such processes may be implemented by the central device.

In another embodiment, the method may further comprise transferring one or more online game-related data objects away from the remote device for which the cheating attack was determined to at least one of other remote device of the plurality of remote devices and the central device. Such a transfer may be preemptive, in one embodiment. In some embodiments, the transfer may not occur as a result of cheating attack. Instead, the transfer may be initiated proactively before an attack is detected. In one embodiment, the transfer may be initiated by the central device. In one example, the transfer may be used in a repair process after a cheating attack has been detected. Prior to the repair, the data object may be checked for damage caused by an attack. In one embodiment, such damage may cause a degradation in health associated with a data object. As described in greater detail below, the health of a data object may change by an amount corresponding to an amount of damage caused by an attack.

In yet another embodiment, the method may further comprise determining a cheating index level for the cheating index, and if a first cheating index level is determined, preemptively transferring the one or more online game-related data objects away from the remote device. In one embodiment, the cheating index level may be determined by the central device.

The method may further comprise disconnecting the remote device from the central device.

In a further embodiment, the method may further comprise determining the cheating index level for the cheating index, and if a second cheating index level is determined, disconnecting the remote device from at least one of the central device or a different remote device of the plurality of remote devices. The first and second cheating index level may be equal or different. Disconnecting may require a higher level (severity) of cheating. If disconnecting and transferring are performed, then transferring data may be performed before the disconnection.

In a further example, determining whether cheating has happened to the online game-related data may further comprise determining an invalid data field change in the online game-related data received from the remote device. For example, bounds and/or rate of change checking may be used. The network protocol may include the definition one or more values in one or more data objects that can be sent over the network. This definition can optionally include bounds and rate of change information. The central device can use this information, when present, to check the incoming network data for possible indications of cheating. For instance, if a player's avatar suddenly goes from minimum to maximum health, or if his position changes by more than a given amount in a single frame, it can be inferred that the remote device is probably cheating and appropriate steps may be taken.

The cheat index may be updated periodically, constantly, or at a specific time, as examples. According to one example, as a new cheat attack is detected or suspected, the cheat index may increase, and the amount of the increase may be based upon the severity of the attack. This may allow many small discrepancies from a single user (device) to add up or increment and eventually trigger the protections that a single large discrepancy may cause. Additionally, the cheat index value may decay slowly over time. This may mean that small discrepancies may trip a threshold when they occur over a short time period, in one embodiment.

DESCRIPTION OF THE FIGURES

In the following, further aspects will be described by way of example, with reference to the following figures.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Figure 1:
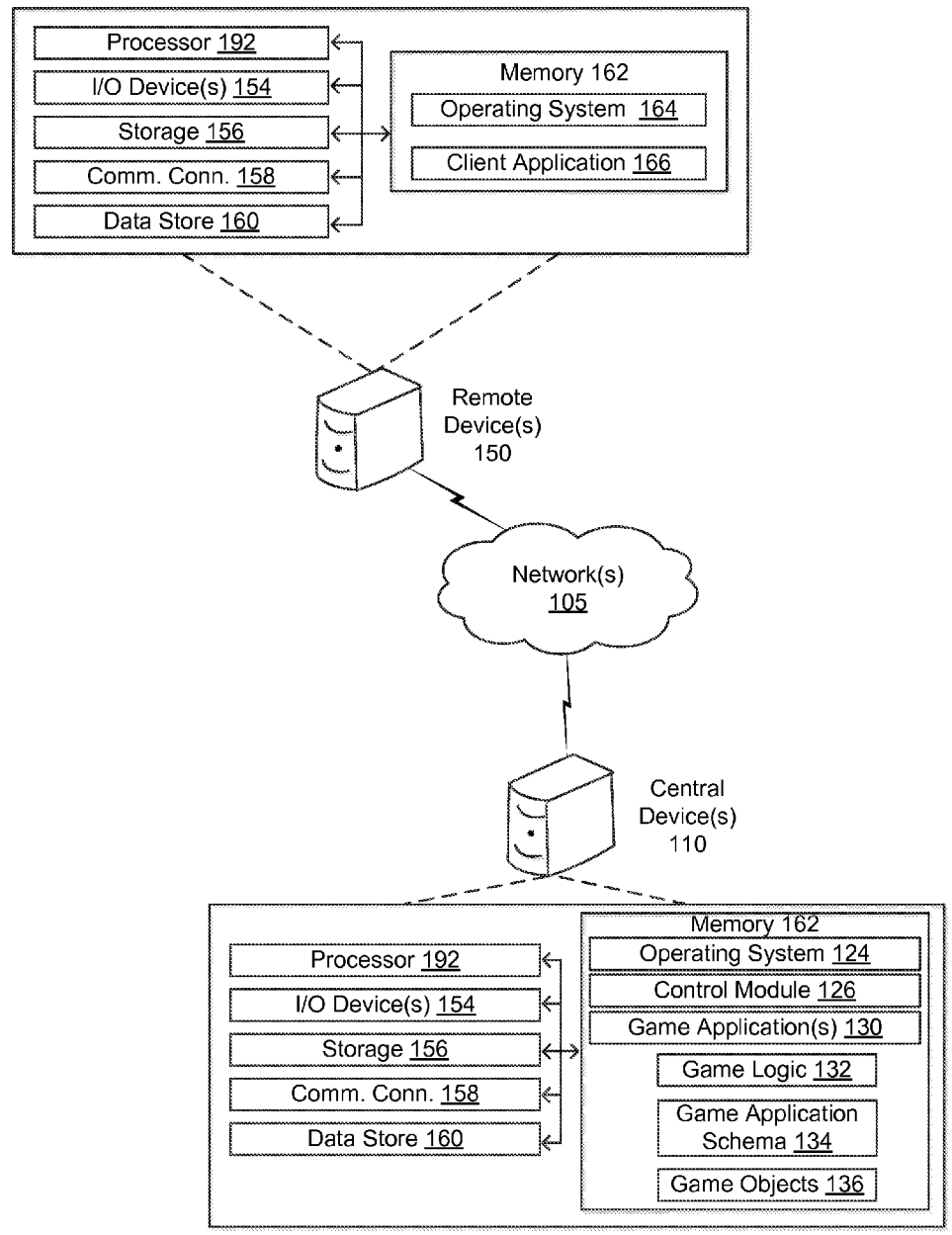
FIG. 1 illustrates a schematic representation of an online game system, in accordance with the embodiment of the disclosure.

FIG. 1 illustrates a schematic representation of an online game system 100, in accordance with the embodiment of the disclosure. The online game system in FIG. 1 may be provided with a system architecture that may be referred to as an arbiter-peer architecture. As shown in FIG. 1, the online game system may comprise a central device 110 and one or more remote devices 150. Although only one central device 110 and remote device 150 is shown, more of each device may exist in other embodiments. Each of the devices in FIG. 1 may communicate with each other over one or more networks 105.

As used herein, the term "device" may refer to any computing component that includes one or more processors that can be configured to execute computer-readable, computer-implemented, or computer-executable instructions. Example devices can include personal computers, server computers, server farms, digital assistants, smart phones, personal digital assistants, digital tablets, Internet appliances, application-specific circuits, microcontrollers, mini-computers, transceivers, or customer premise equipment such as set-top boxes, kiosks, or other processor-based devices. The execution of suitable computer-implemented instructions by one or more processors associated with various devices may form special purpose computers or other particular machines that may implement or facilitate the processes described herein.

The one or more networks 105 may include any number of wired or wireless networks that can enable various computing devices in the example game system 100 to communicate with one another. In other embodiments, other networks, intranets, or combinations of different types of networks may be used including, but not limited to, the Internet, intranets, cable networks, cellular networks, landline-based networks, or other communication mediums connecting multiple computing devices to one another, including communication mediums involving local network structures. Other embodiments may not involve a network and may, for example, provide features on a single device or on devices that are directly connected to one another, e.g., at least a portion of the remote devices 150 may be directly connected to one another.

The devices illustrated in FIG. 1 may include one or more processors configured to communicate with one or more memory devices and various other components or devices. For example, the central device 110 may include one or more processors 112 that are configured to communicate with one or more memory or memory devices 122, one or more input/output (I/O) devices 114, storage 116, one or more communication connections 118, and one or more data stores 120. The processor 112 may be implemented as appropriate in hardware, software, firmware, or a combination thereof. The processor 152 associated with the remote device 150 may be the same or at least similar to the processor 212, in one embodiment.

The memory 122 may store program instructions that are loadable and executable on the processor 112, as well as data generated during the execution of these programs. Depending on the configuration and type of central device 110, the memory 122 may be volatile, such as random access memory (RAM), and/or non-volatile, such as read-only memory (ROM), flash memory, etc. The memory 162 associated with the remote device 150 may be the same or at least similar to the memory 122 in one embodiment.

The storage 116 may include removable and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory (SRAM), dynamic random access memory (DRAM), or ROM.

The memory 122 and the storage 116, both removable and non-removable, are all examples of computer-readable storage media. For example, computer-readable storage media may include volatile and non-volatile, removable and non-removable media implemented in any method or technology for storage of information such as computer-readable instructions, data structures, program modules, or other data.

The one or more communication connections 118 may allow the central device 110 to communicate with other devices, e.g., the one or more remote devices 150, databases, user terminals, and various other devices that may exist on the one or more networks 105. The I/O devices 114 may enable a user to interact with the central device 110. Such I/O devices 114 may include, but are not limited to, a keyboard, a mouse, a pen, a voice input device, a touch input device, a display, a camera or imaging device, speakers, or a printer. The communication connections 158 associated with the remote device 150 may be the same or at least similar to the communication connections 118, in one embodiment. The I/O devices 154 associated with the remote device 150 may be the same or at least similar to the I/O device 114, in one embodiment.

The one or more data stores 120 may store lists, arrays, databases, flat files, etc. In some implementations, the data store 120 may be stored in memory external to the central device 110 but may be accessible via the one or more networks 105, such as with a cloud storage service. The data stores 120 may store information that may facilitate the processes described herein. The data stores 160 associated with the remote device 150 may be the same or at least similar to the data store 120, in one embodiment.

The memory 222 may also store an operating system (O/S) 124 and various software applications and/or modules that may implement or facilitate the processes described herein. One such module may include a game application 130. The central device 110, comprising the trusted hardware components and the software game application running on it, may be referred to as an arbiter.

Each remote device 150 may comprise a software client application 166 running on local hardware components, such as a personal computer. Also, the client application 166 may be implemented on a mobile device, e.g. a mobile phone or a tablet computer, or another device as defined above. The client application may be provided by a browser or a dedicated application, as non-limiting examples. The remote device 150, comprising the local hardware components and the software client application running on it, may also be referred to as a peer.

According to certain embodiments herein, the game system 100 in FIG. 1 may combine the strengths of both the client-server architecture and the peer-to-peer architectures. Game logic 132 may also exist at the central device 110. The term "game logic," as used herein, may refer to the application that the data transferred by a network library is used for, e.g. the network library says that a character's health is zero (0), but this has no meaning until the game logic is applied. In one embodiment, game logic may comprise information associated with collision, character movement, attacking, defending, playing sounds, and/or displaying graphics, or various other information, processes, attributes, aspects, etc. associated with an online game. In one embodiment, minimal game logic may exist on the central device 110 (arbiter). Bandwidth on the remote devices 150 may be reduced. Game logic burden may be distributed amongst multiple remote devices 150, in one embodiment.

In the arbiter-peer system, the central device 110, i.e. the game application 130, may be supplied with a schema 134 defining all network traffic related to the online game. Players or users may connect to the central device 110 (and only the arbiter, in one embodiment) as peers provided by the remote devices 150, which in turn may be assigned to the users. The remote devices 150 may be assigned authoritative control (ownership) over at least a subset of data objects related to the online game. This may be distinct from the client-server architecture, in which the server device generally maintains ownership of all data objects. The term "authoritative control" as used herein may mean that a remote device (e.g., the remote device 150) has permission to access and/or modify the data object. Modifications to the data object, information indicating that the data object has been accessed, etc., may be transferred to other remote devices 150 in the game. A remote device 150 without authoritative control may effectively only have read permissions on the values sent over the network.

All data communication related to the online game may flow through the central device 110. The remote devices 150, acting as peers may not talk directly to each other, i.e. there may not be direct data communication between the remote devices 150. The central device 110, through its knowledge of the network traffic structure, may keep copies of every data object related to the online game (game objects 136), which it may update with any changes that are sent over the network. The central device 110 may also keep track of which data objects 136 are relevant to which remote devices 150, and combine portions of the incoming network streams from multiple remote devices 150 to update the data objects 136 relevant to a given remote device 150. In one embodiment, such tracking and updating may be performed by the control module 126 associated with the central device 110. Additional functions may be performed in other examples.

In the architecture shown in FIG. 1, all or at least a portion of game logic may be delegated to the remote devices 150. One or more remote devices 150 may control at least a subset of the data objects in the online game, and may control game logic related to these data objects. In one embodiment, such control may be performed by the client application 166. The rising bandwidth costs associated with known peer-to-peer networks may be ameliorated herein, by virtue of the fact that each remote device 150 may talk directly to the central device 110.

The central device 110 may maintain a list of all remote devices 150 connected to an online game, such as a game application 130, a list of every data object owned by each remote device 150, and a list of every data object identified as interesting to each remote device 150. In one embodiment, such information may be stored in the data store 120. As used herein, an interesting data object is one which the remote device 150 may need to interact with. If a data object is not interesting to another remote device 150, the remote device 150 may have no knowledge of it. In certain embodiments, therefore, interaction between remote devices may require that the target data object be interesting to the remote device. Some non-limiting example interactions may include display (show on screen), attack, maneuver around, and move towards.

The example shown in FIG. 1 is non-limiting. Other examples may include different devices, software modules, data, communication between devices, etc. For example, multiple modules may be utilized by the remote device 150 to implement the functions described above in association with the remote device 150.

Figure 2:
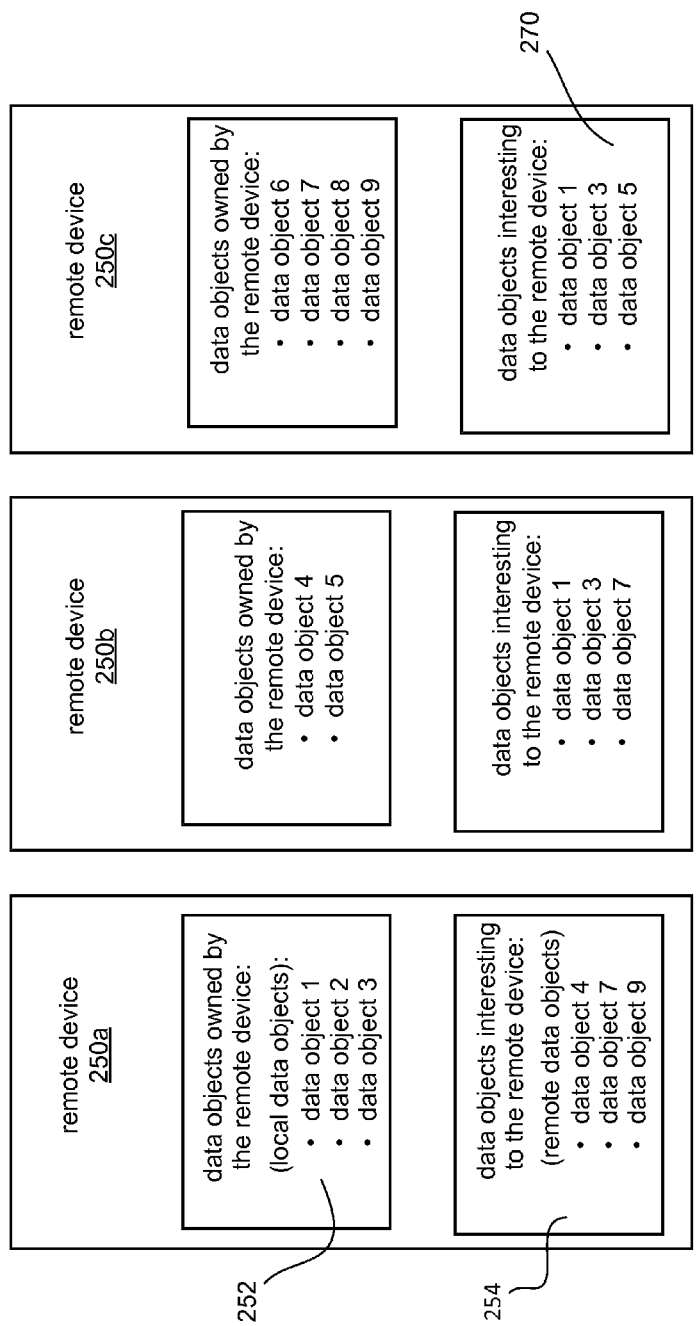
FIGS. 2 and 3 illustrate a schematic representation of remote devices and respective data objects associated with the remote devices, in accordance with an embodiment of the disclosure.
Figure 3:
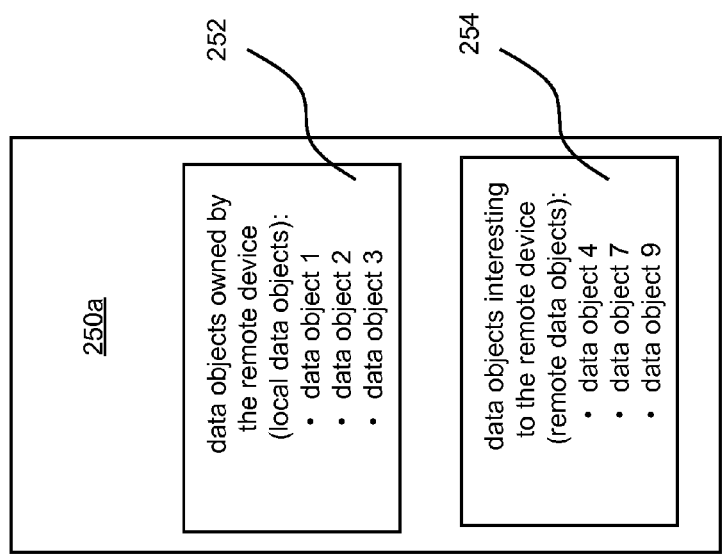

FIGS. 2 and 3 illustrate a schematic representation of remote devices and respective data objects associated with the remote devices, in accordance with an embodiment of the disclosure. Remote devices 250a, 250b, and 250c may each be connected to a central device, such as central device 110 in FIG. 1. Nine data objects may be shared among the remote devices 210, 220, and 230, according to the embodiment in FIG. 2. Fewer or more data objects may be shared in other embodiments. Each remote device 250a, 250b, and 250c may maintain a list of locally owned data objects, such as data objects 252 associated with the remote device 250a, and a list of remote data objects owned by other remote devices (e.g., remote data objects) such as data objects 254 associated with the remote device 250a. The remote data objects 254 may also be referred to as interesting data objects. Note that the list of remote data objects 254 that a remote device 250a knows about may not include every data object currently active in the online game. For example, the remote device 250a may know about remote data objects 4, 7, and 9 as indicated in the "data objects interesting to the remote device" portion associated with a schematic representation of remote device 250a, but the remote device 250a may not know about remote data object 5, for example, which is shown in association with the remote device 250c (e.g., remote data objects 270. For more information, see further explanation below associated with Network LOD. Network LOD may refer to a set of remote objects that are replicated on a device. Devices that are not replicated on a device, for example, may be considered outside of the device's LOD.

Following, some of the concepts or processes associated with networking in the online game system are described. Such concepts or processes may rely on a network library comprising two channels of data communication. In one embodiment, a first channel may be designated reliable, and in-order. That is, any message sent on the first channel may be assumed to have arrived at the destination in the order it was sent. For example, if three messages are sent, such as messages A, B, and C, in the order listed, then all messages may arrive at the destination in the order sent (e.g., A followed by B followed by C). Messages sent on the first channel are referred to as events. As used herein, events are occurrences in the online game that must be properly received on all interested remote devices (peers), such as remote device 150 in FIG. 1. Example events include creating and destroying entities, changes in static fields, and remote procedures, each of which is described in greater detail below. Events may be reliable and processed in-order, in one embodiment. For example, a destroy event for an entity may not be processed before a create event, in one example. The term "entity," as used herein, may refer to the network library's representation of a networked game object (data object). An entity may store the state of the data object and know how to read and write the state from/to the data object. The data object (networked game object) may be distinct from the entity, and may be controlled by the game logic, in one embodiment.

A second channel may be designated unreliable and sequenced. That is, messages sent on the second channel may not be guaranteed to arrive at the destination, but if they do arrive, they will arrive in order, in one embodiment. For instance, if three messages, such as messages A, B and C are sent, but message B is lost, and message A is delayed until after message C, the only message that may be acted upon is message C. Message A may be discarded because it arrived too late, in one example. Messages sent on the second channel are called deltas herein. Deltas may reflect changes in a data object's data. Each time one of a data object's dynamic fields (see below) changes by a significant amount (what constitutes significance is configurable), the change may be sent as a delta to all interested remote devices (peers), such as remote devices 150. In one example, since the second channel used for transmission of deltas is unreliable, changes may be repeated until acknowledged. Since events and deltas use different network channels, it may be possible for a delta for a data object to arrive before its creation event.

A network registry may be responsible for storing a network protocol to be used in the online game system. For example, the network registry may keep track of the network protocol, and how the elements of the protocol are bound to actual game-side code objects.

As used herein, the network protocol may be a schema that defines a network state for an online game. In general, the network or communications protocol may be a system of digital message formats and rules for exchanging those messages in or between the devices of the online game system. The protocol may have a formal description. The network protocols may include signaling, as well as authentication and error detection and correction capabilities. The protocol definition may define the syntax, semantics, and synchronization of data communication; the specified behavior is typically independent of how it is to be implemented. A protocol can be implemented as hardware or software or both. Example protocols may include, but are not limited to, Transmission Control Protocol/Internet Protocol (TCP/IP), HyperText Transfer Protocol (HTTP), and WebSocket protocol.

The network protocol of the online game system may further describe all components that can appear in a class, and how the components combine to create a given class. It can be generated through code reflection, or loaded from an XML file, or other file type. Once generated or loaded, an encoded value such as a hash value may be created from the resulting structure, namely the network protocol. The encoded value can be used to check that every remote device (e.g., remote device 150) connecting to the central device (e.g., central device 110) is using the same network protocol, according to one embodiment. The protocol check, for instance, may be an equality check between the hash of the network protocol on the central device and the hash of the network protocol on each remote device such as the remote device.

Figure 4:
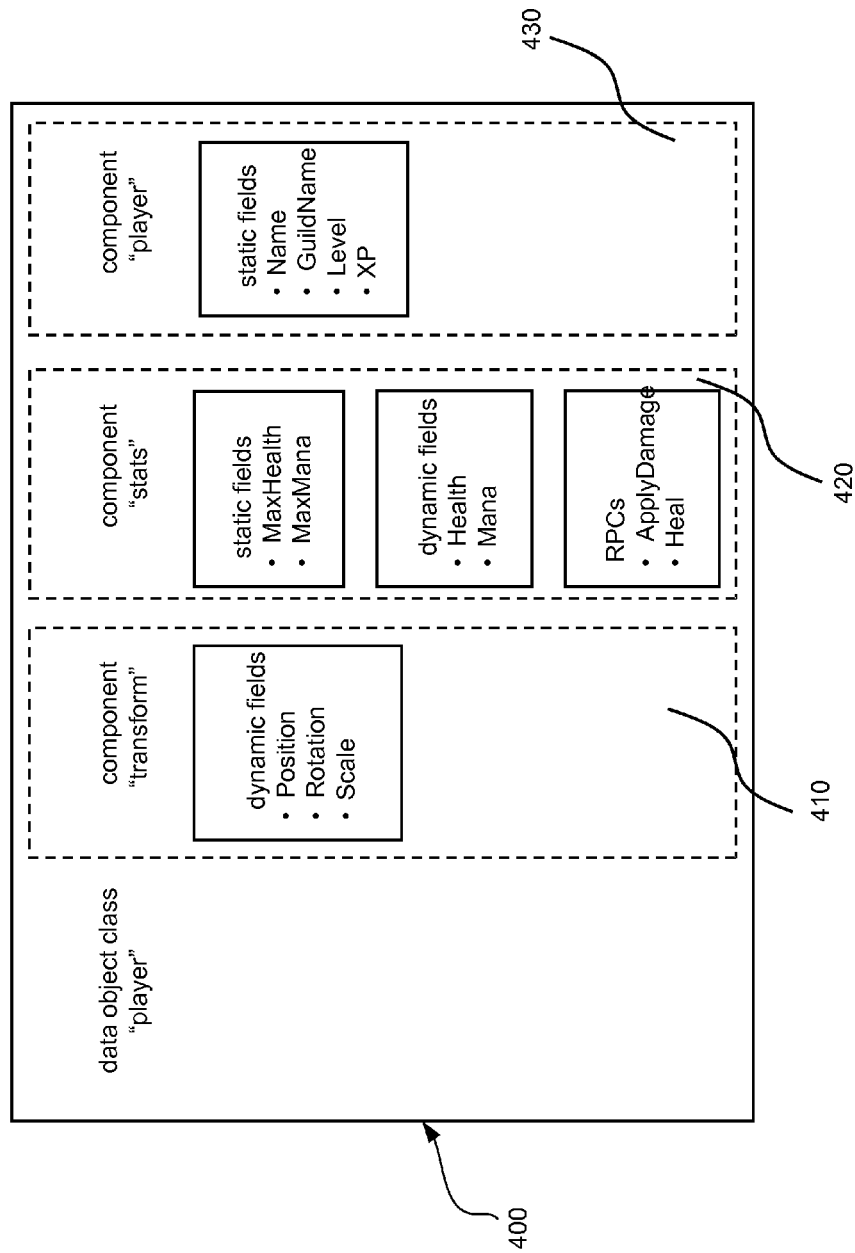
FIG. 4 illustrates a schematic representation of a data object class with various types of components, in accordance with one embodiment of the disclosure.

The network registry may manage how the classes and components defined in the network protocol are bound to run time data structures. Classes may describe the data contained by each type of data object in the online game that needs to be sent over the network, e.g., the one or more network 105 in FIG. 1. FIG. 4 illustrates a schematic representation of a data object class with various types of components, in accordance with one embodiment of the disclosure. For example, FIG. 4 shows a schematic representation of a data object class 400 with three components 410, 420, and 430. Each of the components 410, 420, and 430 may contain several fields, which may represent the portion of the data in the online game that needs to be sent over the network, according to one embodiment. For example, component 410 may be associated with "transform," component 420 may be associated with "stats," and component 430 may be associated with "player." The "transform" component may include position and orientation information; the "stats" component may include statistics, or health, information; and the "player" component may include information about a player, e.g., account name, etc.

In general, each class may consist of one or more components. Each component may contain one or more dynamic fields, static fields and/or remote procedure calls (RPCs). Dynamic fields, as used herein, are variables which are continually monitored for changes. Any significant changes encountered may be automatically transmitted via deltas. Static fields, as used herein, are variables which seldom change, in one embodiment. Static fields may not be monitored and changes to these fields may require manual transmission via an event. Remote procedure calls (RPCs), as used herein, are methods within a component that can be invoked remotely. An RPC invocation is a form of an event.

Once the network registry has been loaded, the format of each data packet that arrives may be understood. But in order to apply that incoming data to game data objects, game data structures may need to be bound to the network registry components and classes. When a data structure is bound to part of the network registry, code reflection can be used to examine the data structure and associate correctly named member variables, properties and functions with the corresponding fields (both dynamic and static) and remote procedures in the protocol components.

If a data structure does not implement all of the networked parts of a network component, then the network component may be considered to be partially bound. The network library may still understand and store the values for the missing fields, but the game may have no access to them, in one embodiment.

As used herein, a data object may refer to an entity that needs to communicate its state over the network of an online game system. Each data object instantiated by the online game may be associated with one of the classes defined in the network protocol (schema). Such an association may facilitate a determination of which properties of the data object get serialized over the network, and the order of the serialization. Once a data object is instantiated, its type may be immutable, in one embodiment.

A data object in the networked game may need to be assigned a unique identification or ID. Groups of IDs may be assigned to remote devices as they connect, and again when they run low. A remote device may be considered to have run low when it has nearly exhausted its assigned group IDs. For example, if an arbiter assigns a group of eight IDs, and creates six objects, it only has two IDs remaining According to this example, having only two IDs remaining when eights IDs were available initially may be considered to be running low. Thus, having approximately 25% of IDs remaining may be considered running low, in one embodiment. Different percentages may be considered running low, in other embodiments. By uniquely assigning IDs to remote devices, a remote device, such as the remote device 150, can create a data object and have a guaranteed unique ID for it.

Each networked data object in an online game may be assigned a network ID and an owner, that is, the remote device that is authoritative over the data object. Additional information may be assigned in other embodiments. The network ID and the owner may be automatically assigned to the remote devices when the data object is created. Ownership may also be changed during the online game session. The game system may be designed to obfuscate ownership of a data object in such a way that only the central device, e.g., central device 110, knows the owner of each data object. Each remote device, e.g., remote device 150, may only know whether or not the data object is locally owned. The remote device that is the owner of a data object may be the only node that is allowed to change its properties, in one embodiment. All or at least a portion of property changes may be required to be made by the owner and then propagated through network messages to other remote devices. Any remote device that is not an owner of the data object can only interact with the data object through Remote Procedure Calls (RPCs), in one embodiment. These are predefined functions that exist on each component. Other techniques or methods may be utilized in other embodiments to allow remote devices to interact with data objects residing at other devices, such as other remote devices 150.

When a message (event or delta) is sent to a data object across the network, it may be required to have a destination remote device. Oftentimes, that destination is the remote device that is authoritative over the data object. In order to facilitate this with obfuscated ownership, the routing for these data objects may be done via an alias, such as NetPeerID-.Owner or NetPeerID.NotOwner, as defined below in Table 1. These aliases are resolved when the message reaches the central device.

In a networked game there may be many networked data objects. If all data object changes in a game scene are sent to every remote device, the bandwidth taken by the online game system may quickly become infeasible. To combat this, a technique may be used called network level of detail. Under this system, it is determined which data objects a remote device is most interested in, and, then, the remote device may know only about those data objects, in one embodiment. Data objects that are outside of the knowledge of the remote device may not be sent to the remote devices.

In one example, one or more components may be defined as observers in the network protocol. The entities that these components are attached to may be automatically interesting to every remote device (and hence may be mirrored on every remote device). Each remote device may then periodically check all or a portion of the data objects that it owns against all or a portion of the observers. Such an action may involve calling a function, e.g., INetComponentObserver.IsInteresting, on each observer. Such a function may provide an indication of whether a data object is interesting. In one embodiment, if the observer reports that the data object is interesting then the data object may be sent to the owner of the observer. If the observer reports that the data object is not interesting, then the data object may not be sent (and may be removed).

The level of detail in the online game system may be achieved via a system called the observer system. Each remote device may define one or more data objects as observers by implementing an interface, such as the INetComponentObserver interface, on the native data object. Observer data objects may be automatically marked interesting to every other remote device in the game, and so may be replicated at the other remote devices.

Each observer data object may implement the interface, such as the INetComponentObserver interface, which may include a function that evaluates the interest of the remote device in a game object. This function may be invoked periodically on all or a portion of remote devices, and for all or a portion of data objects locally owned by the remote devices. If the function determines that the data object is interesting, then the remote object may be replicated on the remote device that owns the observer. In this way, a remote device can be made automatically aware of data objects that exist remotely as they become relevant to that remote device's interests. The above example if non-limiting. Various other interfaces and/or functions may be utilized in other embodiments.

Figure 5:
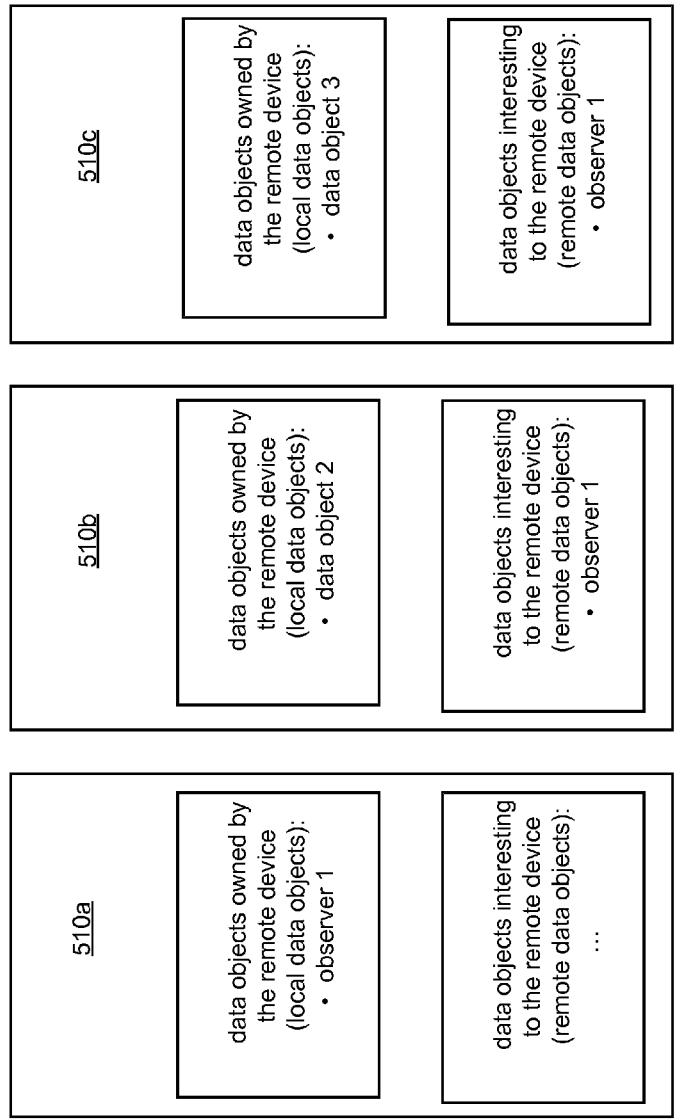
FIG. 5 illustrates a schematic representation of remote devices and respective data objects associated with the remote devices, in accordance with one embodiment of the disclosure.
Figure 6:
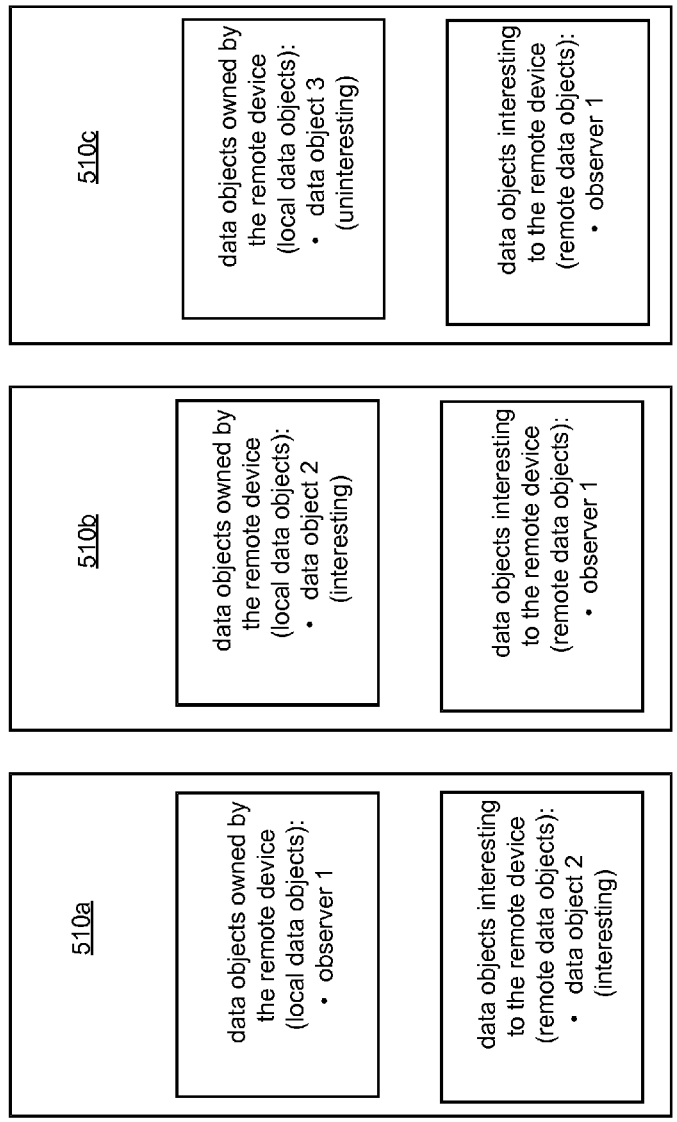
FIG. 6 illustrates a further schematic representation of the remote devices in FIG. 5, in accordance with one embodiment of the disclosure.

FIGS. 5 and 6 include an illustration of remote devices 510a, 510b, and 510c. Remote device 510a may own an observer, which may be automatically reflected on remote devices 510b and 510c. Remote devices 510a and 510c may each own one data object (e.g., indicated by "local data objects" in FIG. 5), whose significance to remote device 510a may be determined. Remote device 510b may own a data object that is interesting to remote device 510b, and remote device 510c may own a data object that is not interesting to remote device 510b. When remote device 510b polls remote device 510b's observer about the interesting data object, the observer may reply that it is interested, and so remote device 510b may replicate the data object to remote device 510a. When remote device 510c polls remote devices 510a's observer about the uninteresting data object, the observer may reply that it is not interested, and so remote device 510c may not replicate the data object. Note that the decision whether or not a data object is interesting may be made by the replicated observer on the remote client device. This may be necessary because, until the data object is deemed interesting, the observer's owner may not know about the data object.

Following, operations associated with a central device (arbiter), such as the central device 110 in FIG. 1, are described.

Figure 7:
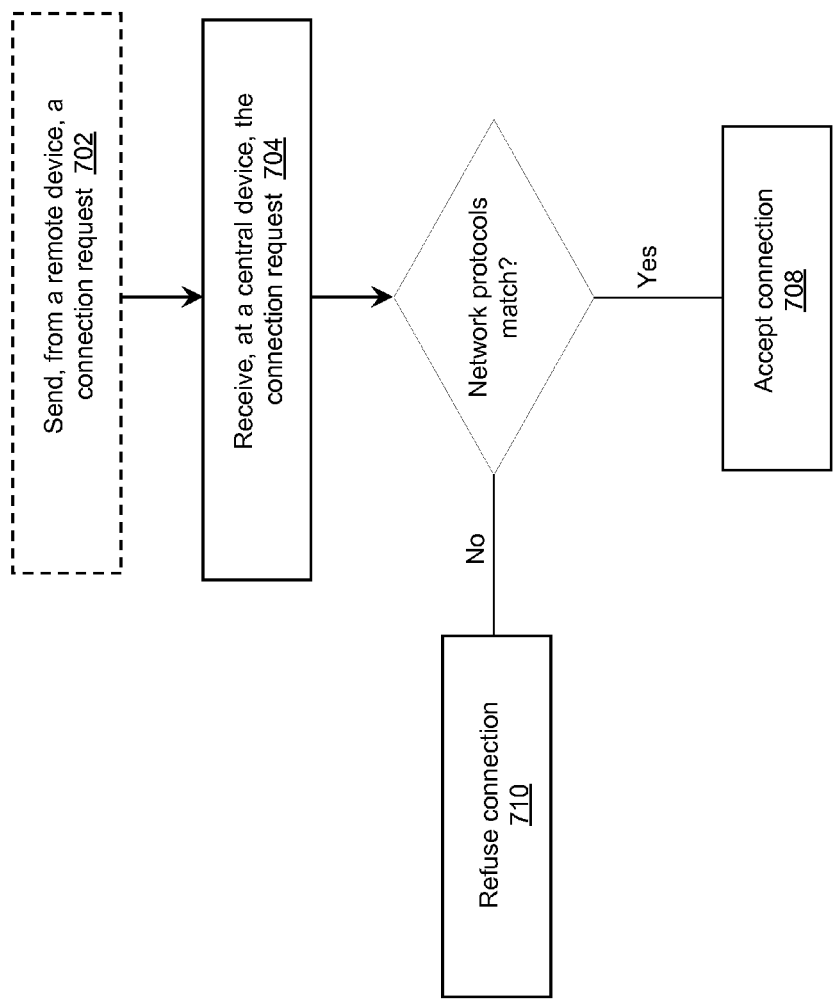
FIGS. 7 and 8 illustrate a schematic block diagram of a process for connecting a remote device to the central device, in accordance with one embodiment of the disclosure.
Figure 8:
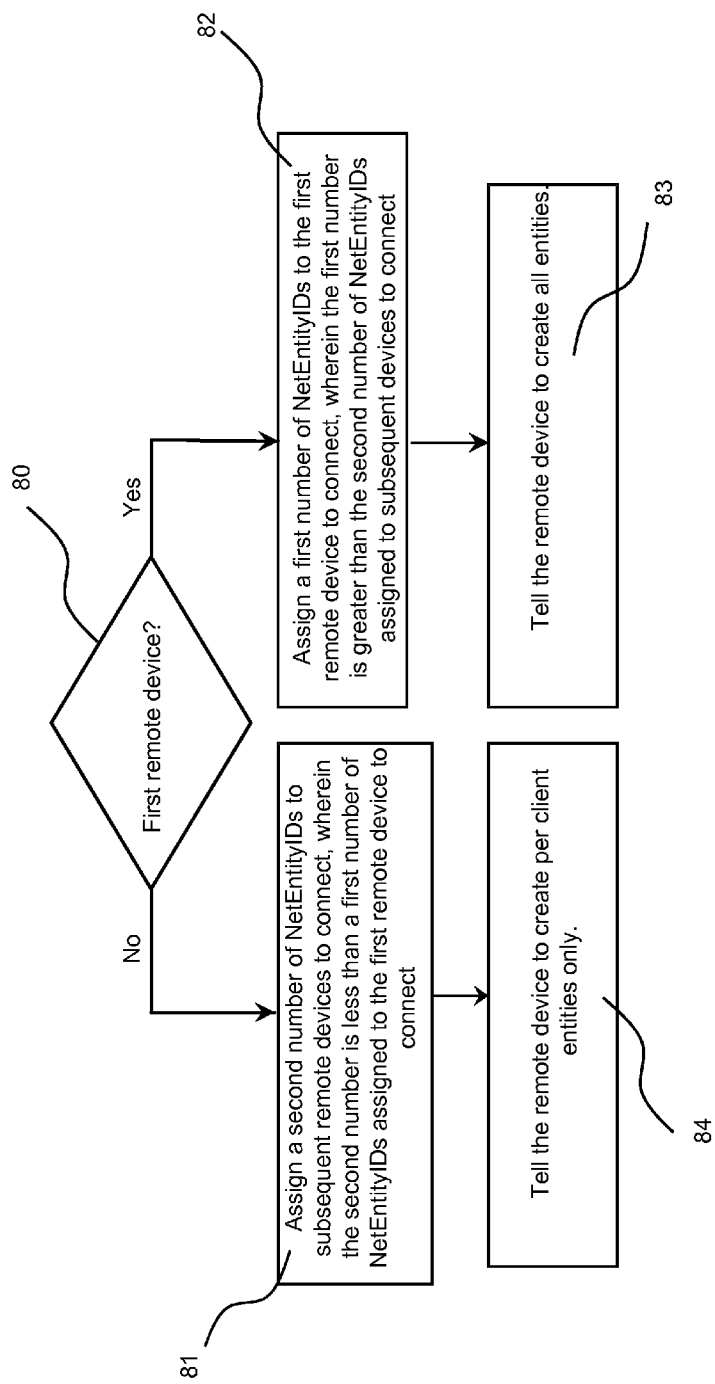

Referring to FIGS. 7 and 8, when a remote device, such as the remote device 150, wants to connect to a central device, such as the central device 110, it may send a connection packet to the central device, at block 702. This connection packet may include, but is not limited to, the network protocol hash. When the central device receives a connect packet from a remote device, at a block 702, it may first check that the network protocol hash is identical to the central device's own protocol hash, in block 72. This may ensure that the remote device and the central device can understand each other's data transmissions. If the protocol is verified to be correct by the central device, at decision block 706, connection may be accepted by the central device, at block 708. If the protocol is not verified, connection may be refused, at block 710.

Referring to FIG. 8, once the protocol has been verified to be correct, the central device may then check if the remote device is the first to connect, at block 80. Since the central device may not know about the online game, it may rely on the connecting remote devices to supply information, such as the level layout. As used herein, level layout may refer to the initial positioning of objects in a game network, as well as the values of their associated variables. It may do this by designating the first remote device to join the job as "server." The remote device providing the joint server function may be responsible for creating every entity in the level, in one embodiment.

The central device may then assign a set of NetEntityIDs to the remote devices (block 81, 82), so that the remote device can safely create data objects. In one embodiment, the NetEntityIDs may be identifiers (or IDs) that are associated with objects by remote devices. A NetEntityID may be assigned to a remote device. As shown in FIG. 8, "n" may be the number of NetEntityIDs assigned to the first remote device to connect. "M" (shown as lowercase "m" in FIG. 8) may be the number of NetEntityIDs assigned to subsequent remote devices. More IDs may be required for the first remote device to connect because such the first remote device may be required to create a larger portion of the objects than subsequent remote devices, in one embodiment. Hence, m<n as shown in block 81 in FIG. 8. Subsequent remote devices, to join the other remote devices, may only be required to create objects specific to their respective player. Thus, less IDs may be required for subsequent devices, hence n>m, as shown in block 82 in FIG. 8. If the remote device is designated as "server," more IDs may be sent, since this node will have to instantiate more data objects at game startup. Finally, the central device may tell the remote device what kind of data objects it is responsible for creating; the first remote device to join may be required to create all networked objects (block 83); and subsequent remote devices may only need to create their avatars (block 84).

There may be other data in the connection packet, in some embodiments. Such data may include an identification of the level or area that each remote device wants to play in. Remote devices that attempt to connect with a different identifier than other remote devices can then be refused connection, in one embodiment. The level identifier can either be specified to the central device at launch time, or taken from the first remote device to connect to the central device. Also, any IDs associated with the remote device externally may be other data. For example if your application is an online game that attaches to different servers for each level, it may be prudent to attach a unique identifier to each remote device so you can track his movement between servers. Such data may be application-dependent.

Figure 9:
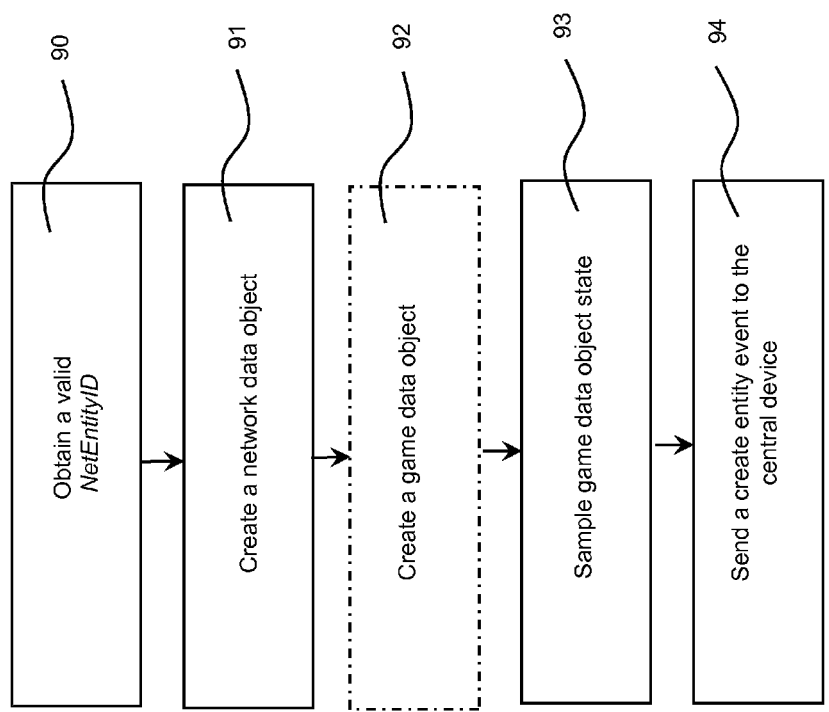
FIGS. 9-11 illustrate a block diagram of various processes for a schematic block diagram for handling a data object related to an online game in the online game system, in accordance with one embodiment of the disclosure.
Figure 10:
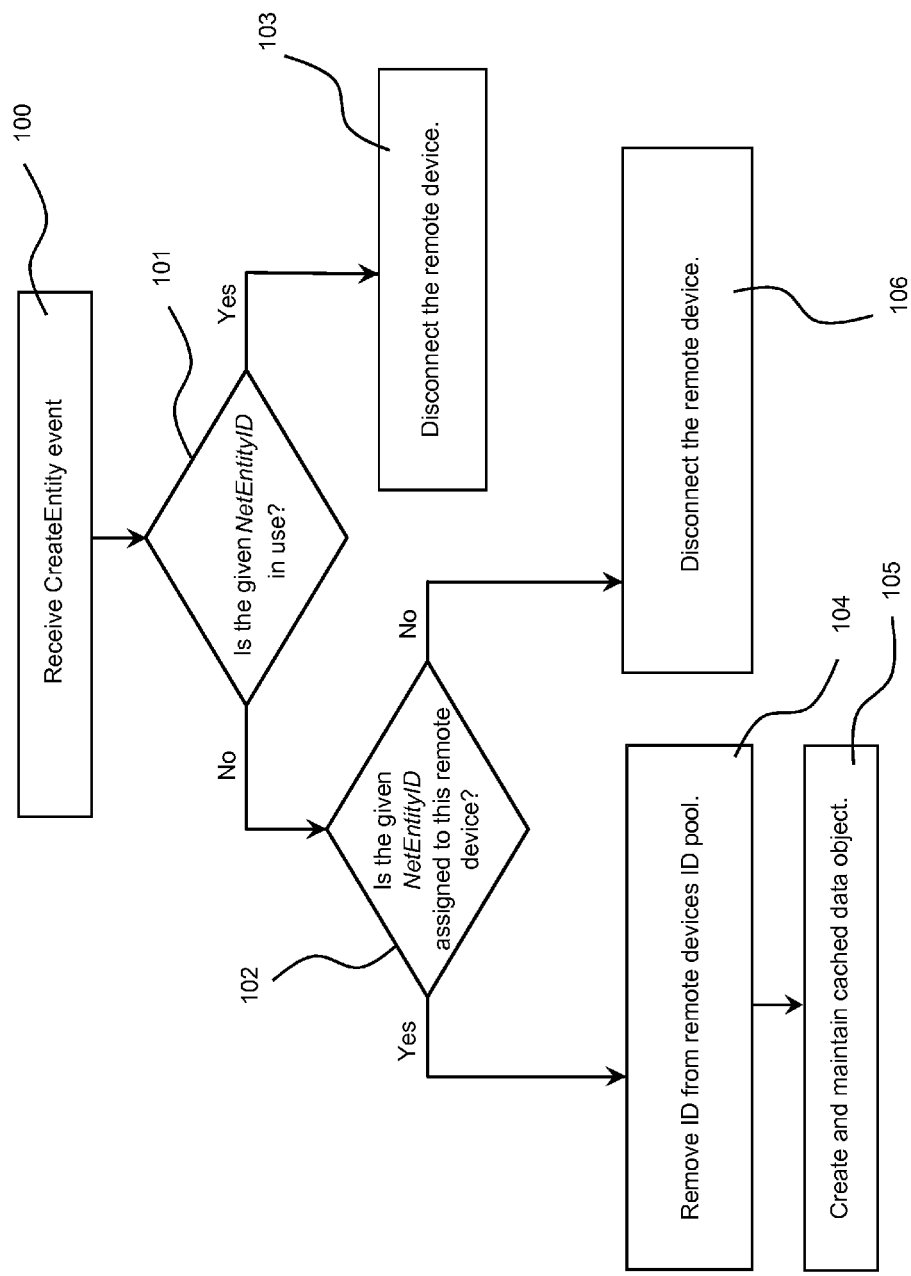
Figure 11:
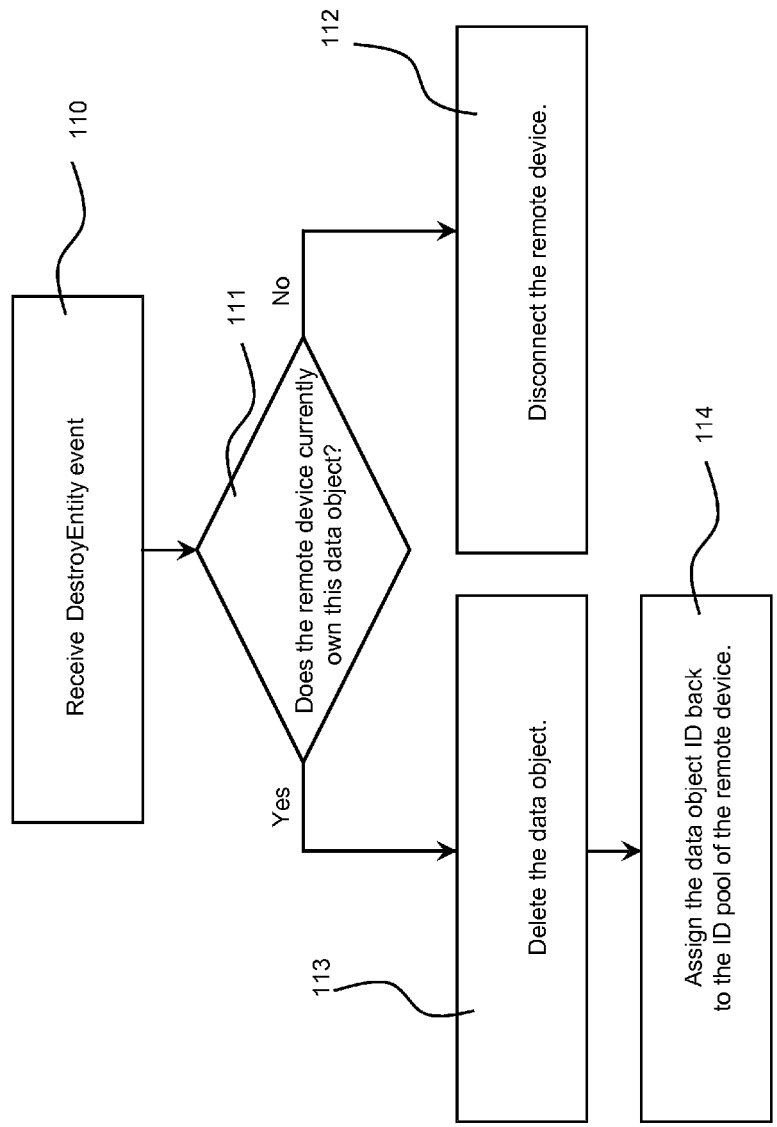

Referring to FIGS. 9, 10, and 11, operations for creating and destroying a data object are described. When a remote device creates a data object, in block 90 it may first obtain a valid NetEntityID, or more generally a unique network identification for a remote device. As previously described, the central device may assign a group of NetEntityID's to each remote device upon connection, and also when the pool of IDs on a remote device drops below a certain minimum. Other occurrences may trigger assignment of a NetEntityID, in other embodiments. Once a NetEntityID has been obtained, the remote device may then create a networked data object of the correct class, in block 91, and ask the game code to instantiate a game object of the associated type, in block 92. The state of the game object may then be sampled and used to initialize the network state (block 93). In block 94, the remote device may then send a CreateEntity event to the central device, or another command to create an entity.

Referring to FIG. 10, upon receiving an event associated with creating an entity, (block 100), the central device may first check to see if the ID that the data object is trying to use is available and assigned to the given remote devices (blocks 101 and 102). If the ID is already in use, or the given ID is not assigned to the remote devices, the central device may ignore the request and forcibly disconnect the remote device for improper object creation (block 103). If the ID is valid, in block 104 the central device may first remove the ID from the ID pool of the remote device. The central device may then create a cached copy of the game data, which it then maintains (block 105). Otherwise, the central device may disconnect the remote device (block 106). Such a disconnect may be forced, in one embodiment.

Referring to FIG. 11, when a central device attempts to destroy a data object that it owns, in block 110, it may sends a DestroyEntity event to the central device, or a similar command to delete or remove an entity. Upon receiving the event, in block 111, the central device may first check to see if the peer is allowed to destroy the data object. The remote device must own the data object to be able to destroy it, in one embodiment. If the remote device is not allowed to destroy the data object, because the remote device does not have authoritative ownership, then the remote device may be disconnected for attempting an illegal entity destruction, in block 112. If the remote device is allowed to destroy the data object, then the cached data object may be removed (block 113), and the ID may be assigned to the remote device's 2 ID pool, in block 114.

When a message is sent, it may be required to have a destination node, in some embodiments. This destination can be either a single remote device (or the arbiter) or a group of peers, as examples. Messages sent to a single remote device may use the client device's ID to send the message. Messages sent to multiple remote devices may use reserved remote device IDs that are designated as aliases, in one embodiment. Several remote device IDs may be reserved as aliases for IDs. These aliases may be used when a single message is sent to multiple remote devices, or when sufficient data to properly address the correct peer is unavailable. For instance, the NetPeerID.Owner alias may cause the message to be sent to the remote device that owns the data object that the message refers to. Similarly, NetPeerID.NotOwner may send the message to all remote devices except the remote device that owns the data object, in one embodiment. A complete list of aliases is given in the following Table 1.

TABLE 1

| | |
|---|---|
| NetPeerID.All | Addresses every node (including the central device and yourself). |
| NetPeerID.Arbiter | Addresses the central device |
| NetPeerID.Self | Addresses the originating remote device. |
| NetPeerID.Owner | Addresses the owner of the object referenced by the message. |
| NetPeerID.NotArbiter | Addresses everyone except the central device. |
| NetPeerID.NotSelf | Addresses everyone except the originating remote device. |
| NetPeerID.NotOwner | Addresses everyone except the data object's owner. |
| NetPeerID.Complement | Use this in combination with a non-aliased ID to send to everyone except that remote device. |

Figure 12:
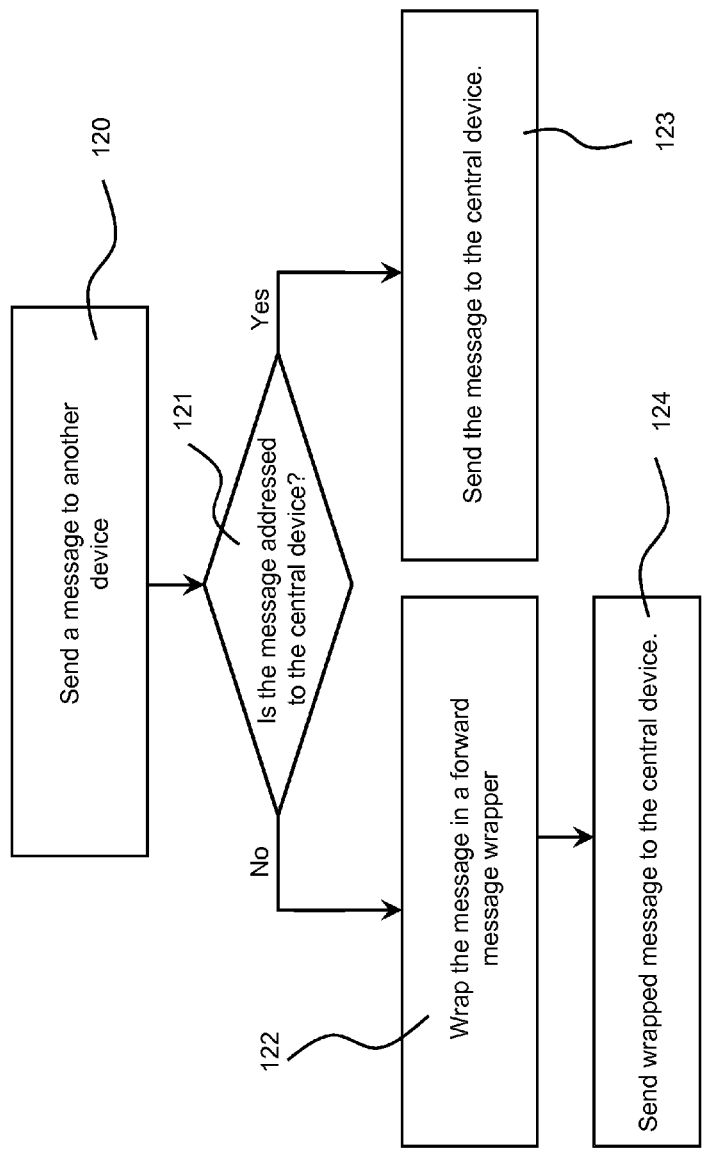
FIGS. 12 and 13 illustrate a schematic block diagram of a process for implementing data communications in the online game system, in accordance with an embodiment of the disclosure.
Figure 13:
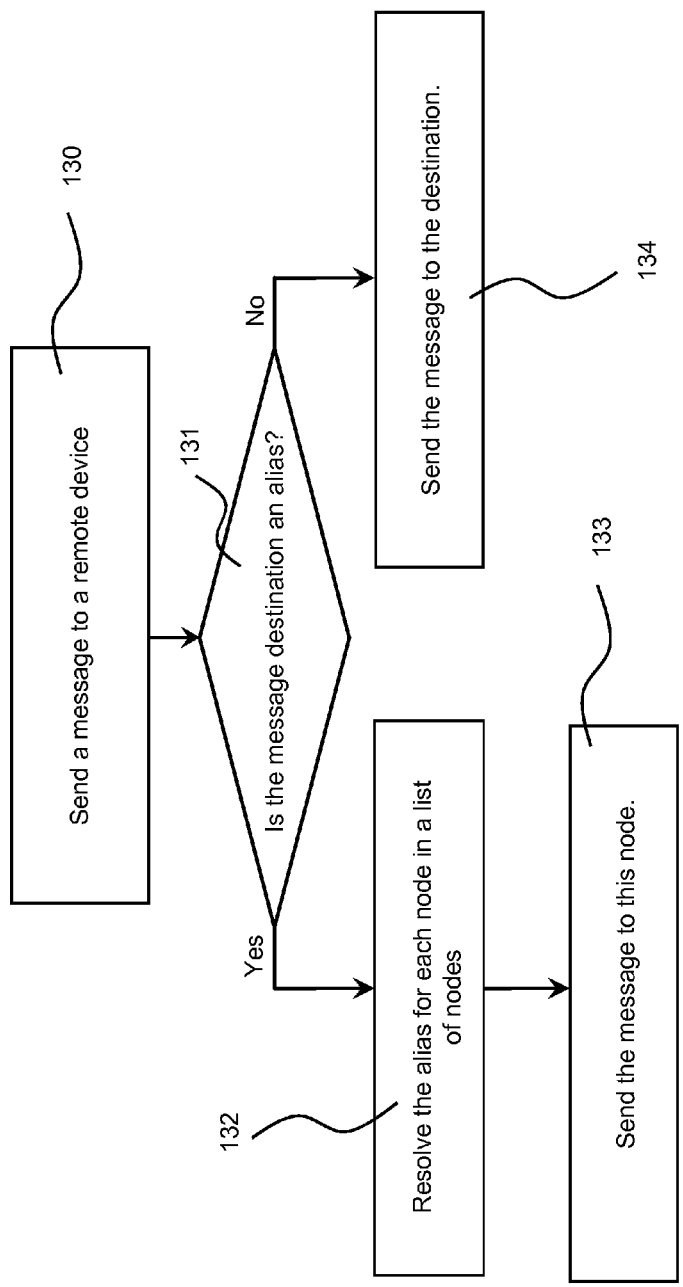

FIGS. 12 and 13 illustrate a schematic block diagram of a process for implementing data communications in the online game system, in accordance with an embodiment of the disclosure. According to the example embodiment in FIGS. 12 and 13, remote devices may only be allowed to talk directly to the central device. For example, if a remote device attempts to send a message to a device other than the central device, the message may be wrapped in a forward message wrapper and then sent to the central device (see FIG. 12, blocks 120-124). When the central device receives this message, it may unwrap the inner message and then sends it to the correct destination(s).

Referring to FIG. 13, when the central device sends a message (block 130), in block 131, it may first determine the correct destination node(s). If the destination remote device ID is an alias, it may resolve the alias into a list of destinations (block 132). If the destination peer ID is not an alias (block 134), the message may be sent directly to the destination.

Figure 14:
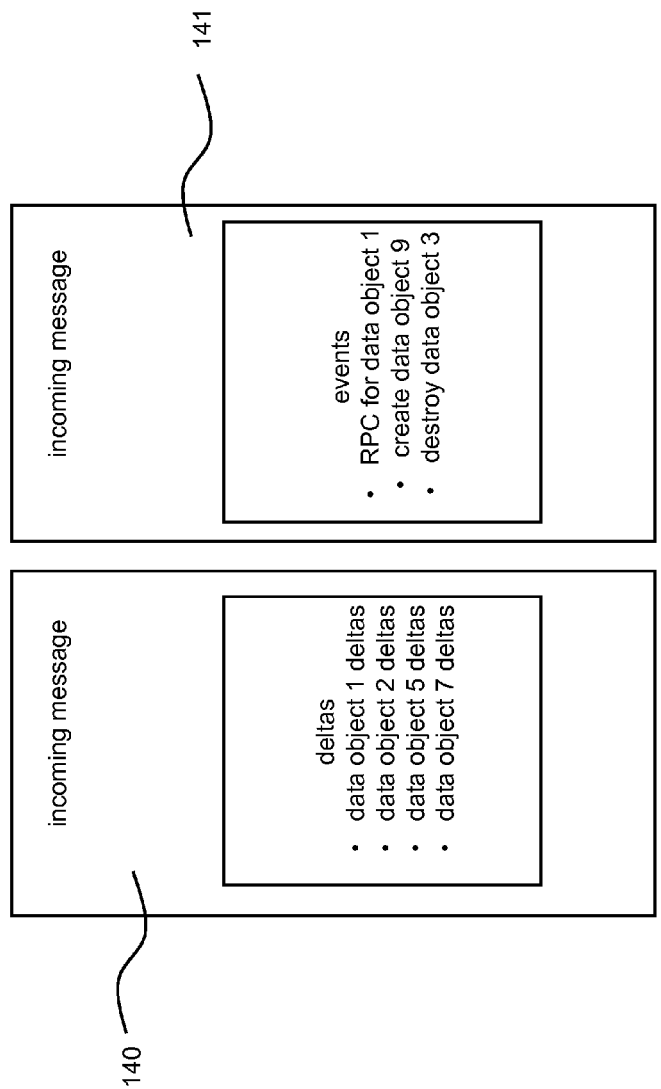
FIG. 14 illustrates incoming messages arriving at a central device in an online game system, in with one embodiment of the disclosure.

The central device may use a network protocol, as described above, to understand the packets that arrive from each remote device. FIG. 14 illustrates two messages arriving at the central device: a deltas message 140 and an events message 141.

Figure 15:
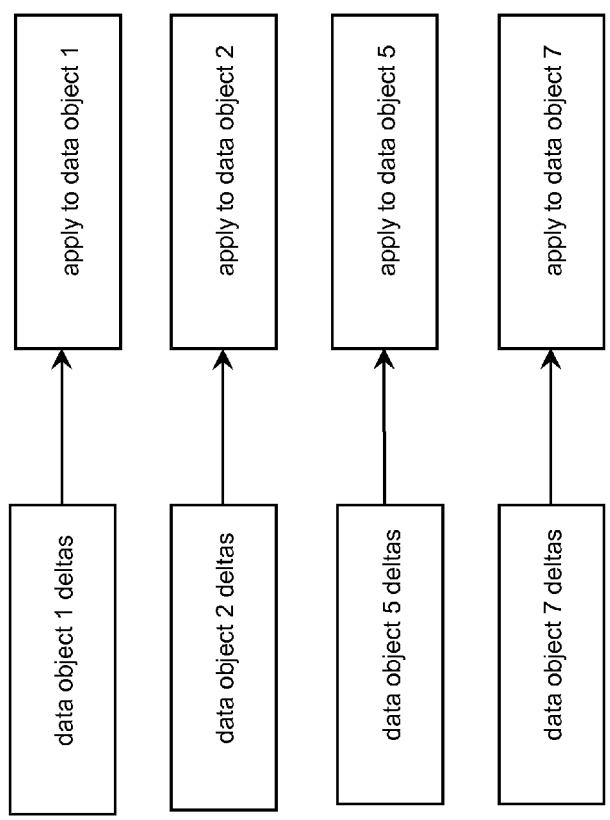
FIG. 15 illustrates a block diagram of a process for updating data objects in a central device of the online game system, in accordance with one embodiment of the disclosure.

When a message arrives at the central device, the central device may use its knowledge of the data format to extract the data from the packets. For delta messages, the central device may use the extracted information to update its cached version of the data objects (see FIG. 15). In FIG. 15, incoming packets (e.g., data object 1 deltas, data object 2 deltas, data object 5 deltas, and data object 7 deltas) may contain deltas, or information associated with changes, to specific objects. Such changes may be applied to data objects (e.g., data object 1, data object 2, data object 5, and data object 7). According to various embodiments, a delta may be a value that may be added to an existing value or may include a complete value, which may include the results of addition. Whether the value to be used in addition or the complete value is used may depend on the underlying data type and the type of encoding of the data type, in one embodiment. The central device may periodically create outgoing packets using its cached state, tailored for each individual remote device. In one embodiment, a remote device may only be sent updates for data objects that it knows about (see network level of detail described above).

Figure 16:
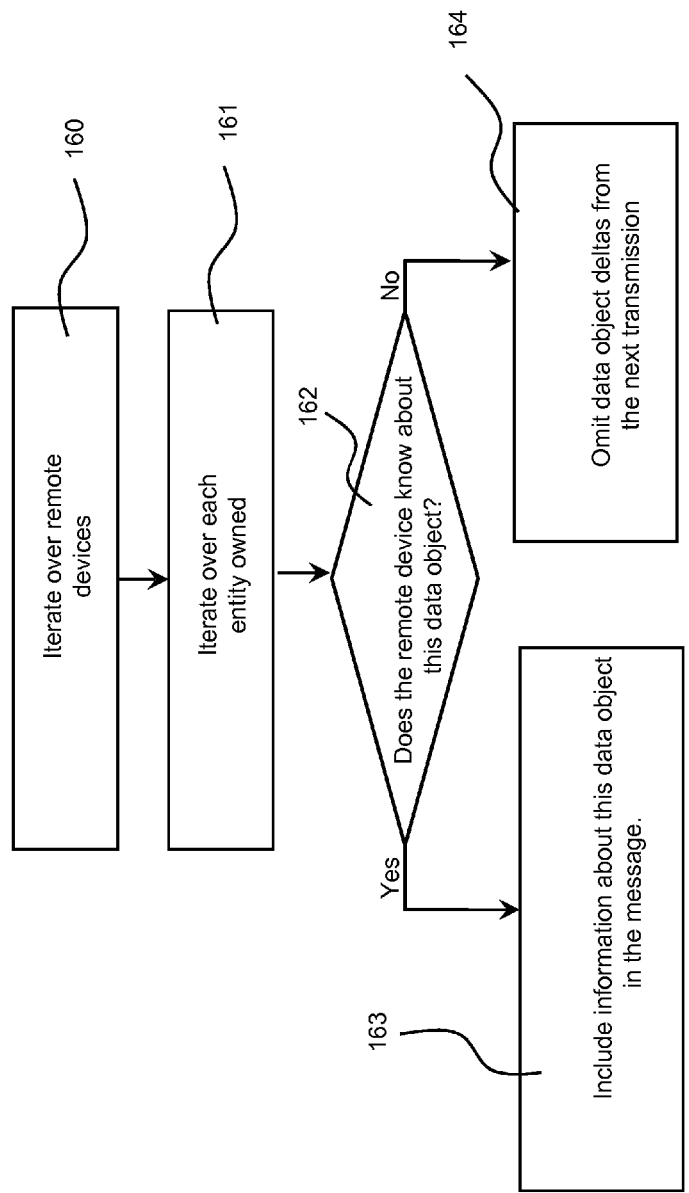
FIG. 16 illustrates a schematic block diagram of a process for creating a message tailored for a remote device, in accordance with one embodiment of the disclosure.

FIG. 16 illustrates the process of creating a message tailored for a given remote device. In a block 160, a remote device may iterate over, or access, all or at least a portion of the devices to which it is connected. In one embodiment, for each entity (e.g., object) known to a remote device, any data changes for that object may be included in the outgoing message. In block 161, the receiver device may iterate over every entity that it owns. If the given entity is known by the given remote device (block 162), according to block 163, data object deltas for this data object may be included in the next transmission to the remote device, or, data object deltas for this object may be omitted from the next transmission to the remote device (block 164).

Using partial class binding, it may be possible for the central device to implement special functionality for certain objects. This could be used to, for instance, securely look up a player's avatar definition in a database. When used in this way, this may obviate the need for the remote devices to have knowledge about the game database, and consolidate all database access in a single place. Functionality may be added in this way by defining a remote procedure (RPC) in the schema for a given component, in one embodiment. The central device may implement this procedure in a partial component implementation, and bind to the component in the registry. A remote device may request execution of this RPC on the central device. When the central device receives the RPC request, the bound function may be called with the appropriate arguments. The central device may then perform the action and return the result via another RPC back to the originating remote device.

Figure 17:
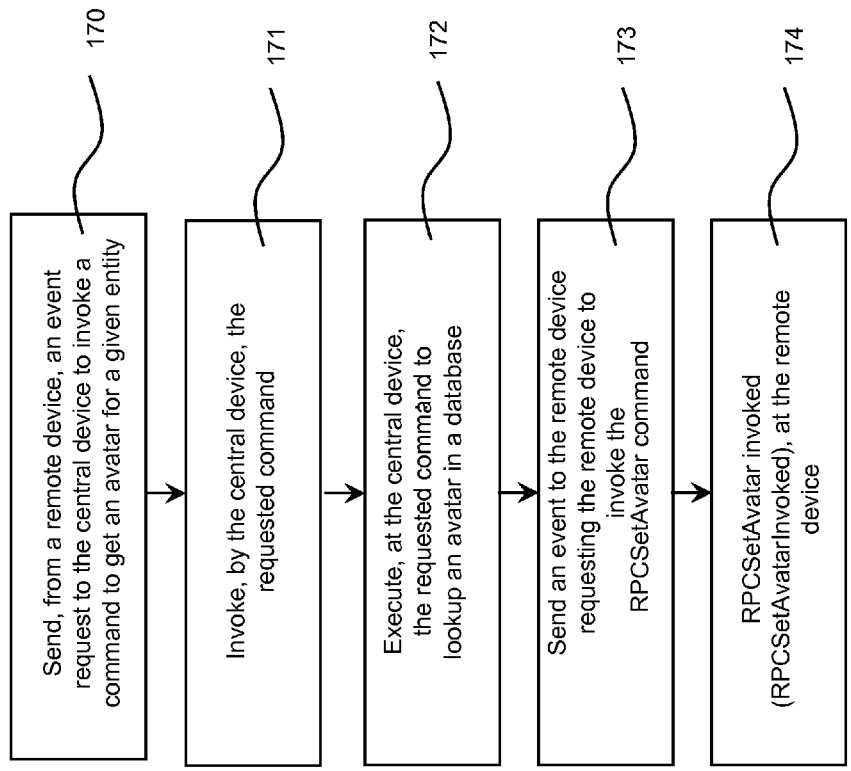
FIG. 17 illustrates a block diagram of a process for requesting an avatar definition by a remote device via a Remote Procedure Call (RPC), in accordance with one embodiment of the disclosure.

FIG. 17 shows an example of a peer requesting retrieval of his avatar definition via an RPC. In block 170, the remote device may send an event to the central device asking it to invoke the RPC RPCGetAvatar on a given entity. The central device may receive the event and invoke the requested RPC, in block 171. In block 172, the central device may execute RPCGetAvatar on the central device to, for example, look up the avatar in a database or other storage mechanism. This function may be part of the game logic, in one embodiment. In block 173, the RPCGetAvatar function may send an event to the original remote device asking it to invoke RPCSetAvatar on the same entity with the function result. In block 174, the remote device may receive the event and execute the requested RPC.

In the above example, the component schema includes two RPC's: RPCGetAvatar and RPCSetAvatar. The remote device may bind to RPCSetAvatar (to receive the definition) and the central device to RPCGetAvatar (to accept requests for the avatar definition). The above example is non-limiting. Many more examples, involving different functions, requests, devices, etc., may exist in other embodiments. The function names included herein are not meant to be limiting. Various other names or identifications of functions may be used in other embodiments.

According to certain embodiment, the central device can transfer the ownership of objects between remote devices via a process called data object migration. Migration is an operation involving multiple remote devices, such as the remote devices 150, including the current owner of the data object and the new owner of the data object. Migration can be done either cooperatively or forcibly.

Figure 18:
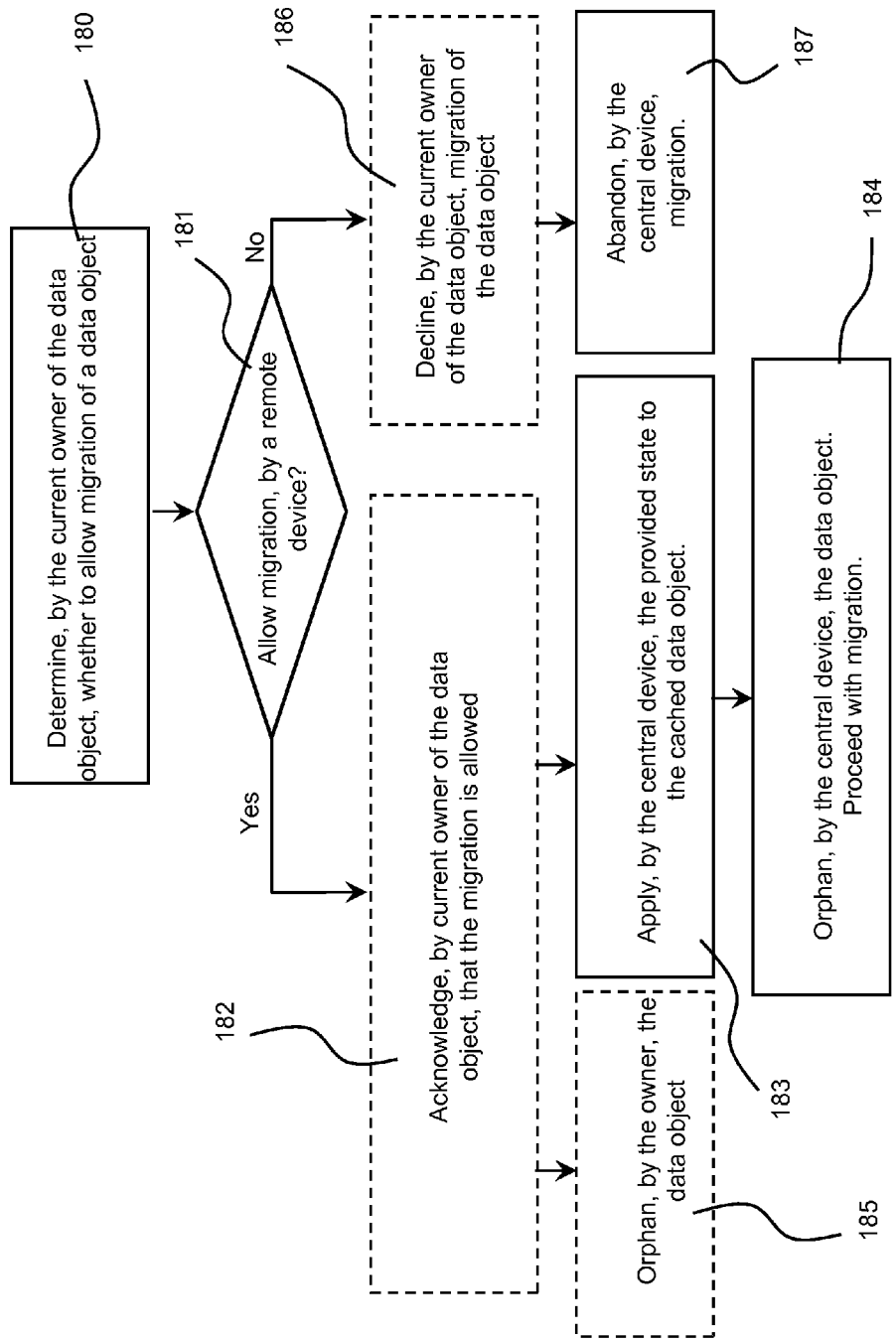
FIG. 18 illustrates a block diagram of a co-operative data object migration process, in accordance with one embodiment of the disclosure.

Referring to FIG. 18, in a cooperative migration, the first block may be to request that the current owner relinquish control of the data object (blocks 180, 181). If the current owner agrees (block 182), then a device associated with the current owner may respond with an up-to-date state snapshot for the data object, and the ownership of the data object on both the central device and the current owner (remote device) may be set to an undefined state (the object is "orphaned") (blocks 182-185). If the current owner declines (see blocks 186, 187), the migration does may not proceed. In FIG. 18, boxes with bold lines indicate actions on the central device, and boxes with dashed lines indicate actions on the data object's current owner, namely the remote device owning the data object.

Figure 19:
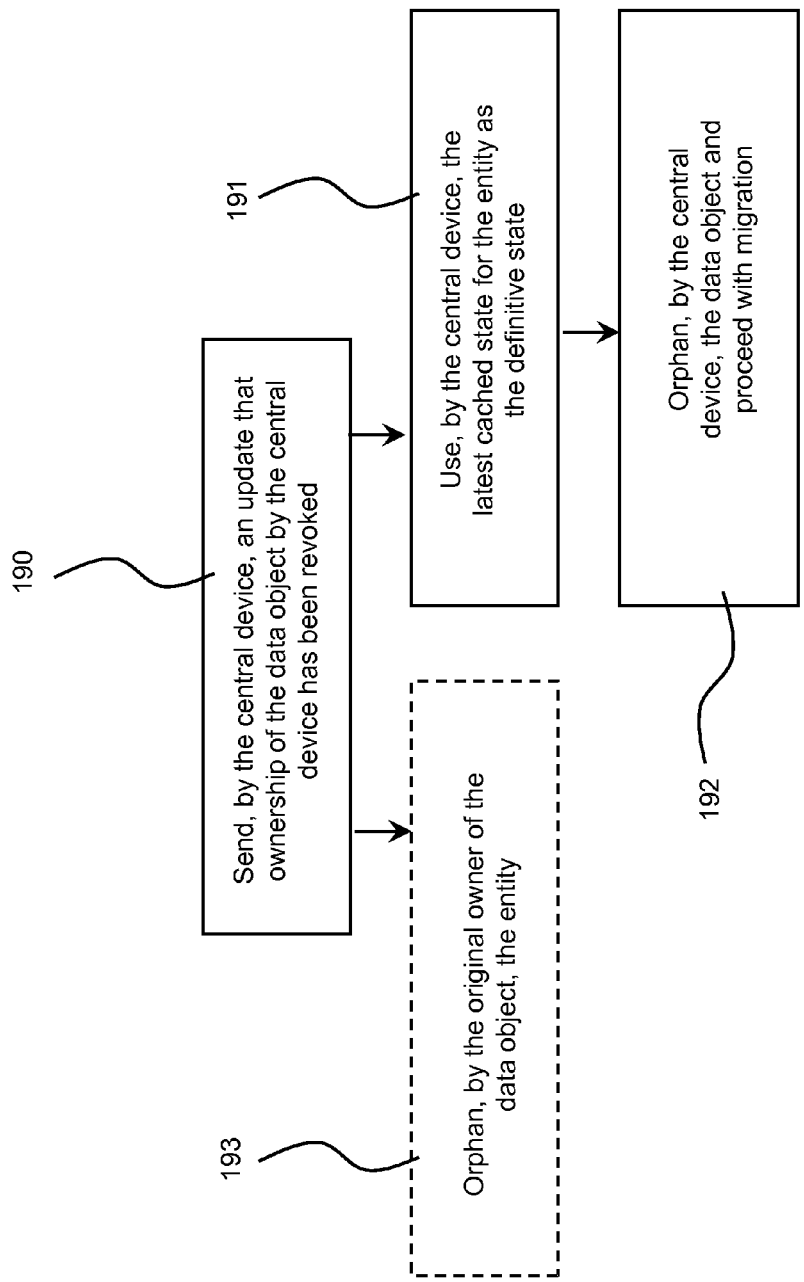
FIG. 19 illustrates a block diagram of a forced data object migration process, in accordance with one embodiment of the disclosure.

Referring to FIG. 19, in a forced migration, the central device may perform the migration and send an update to the current owner device that it has had its ownership of a data object revoked (block 190). According to block 193, the original owner may orphan the entity. In block 191, the central device may use the latest cached state for the entity as the definitive state. In block 192, the central device may orphan the entity, then proceed with the migration as per FIG. 21. In FIG. 19, boxes with bold lines indicate actions on the central device, while boxes with dashed lines indicate actions on the data object's current owner, namely the remote device owning the data object.

Figure 20:
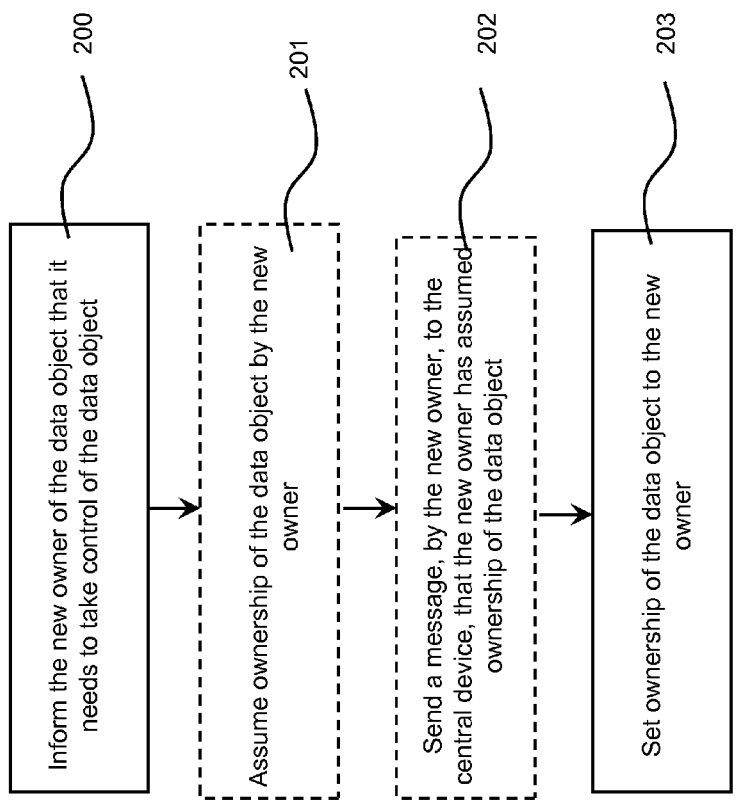
FIG. 20 illustrates a further block diagram of a data object migration process, in accordance with one embodiment of the disclosure.

Referring to FIG. 20, the next block 200 may be to inform the new owner (device) that it needs to take control of the data object. This request may include a complete state snapshot of the data object, which may allow the new owner to start with the correct object state. In the case of a cooperative migration, this snapshot may have been supplied by the original owner. For a forced migration, the snapshot may be the current cached state of the object on the central device.

When the new owner replies to the central device that it has assumed ownership, in blocks 201 and 202, the central device may set ownership of the data object to the new owner, in block 203, and the migration may be complete. FIG. 20 therefore illustrates the completion of the migration process, according to one embodiment. Boxes with bold lines indicate actions on the central device, while boxes with dashed lines indicate actions on the object's new owner. Since object ownership is obfuscated, only the central device and the old and new owners (both being remote devices) may be included in the migration process, according to one embodiment.

During the migration process, ownership of a data object becomes undefined. Whilst a data object is in this state, most events that are being routed to this data object are delayed on the central device until the data object's ownership is resolved. This allows the migration process to be completely transparent to regular network traffic. Events sent to the data object that may be delayed include static attribute changes and remote procedure calls. These events must be delayed because they rely on the ownership of the object being well defined. Events sent to the data object that are not delayed include any events relevant to the migration process.

Migration may require tight cooperation between three network nodes: the central device, the current owning remote device and the intended new owning remote device. If one of these devices or nodes disconnects, the migration may still be completed, in one embodiment.

Disconnection of the central device may be a catastrophic event that cannot be recovered from, in some examples. The online game may be over when such an event occurs, since none of the remote devices can talk to each other, according to one example. If a remote device being the current owner of a data object disconnects before it has relinquished ownership of the data object, the migration may be referred to as a forced migration. If the device remote device disconnects after relinquishing ownership, the migration may proceed as normal, since the current owner may no longer be involved in the process.

Figure 21:
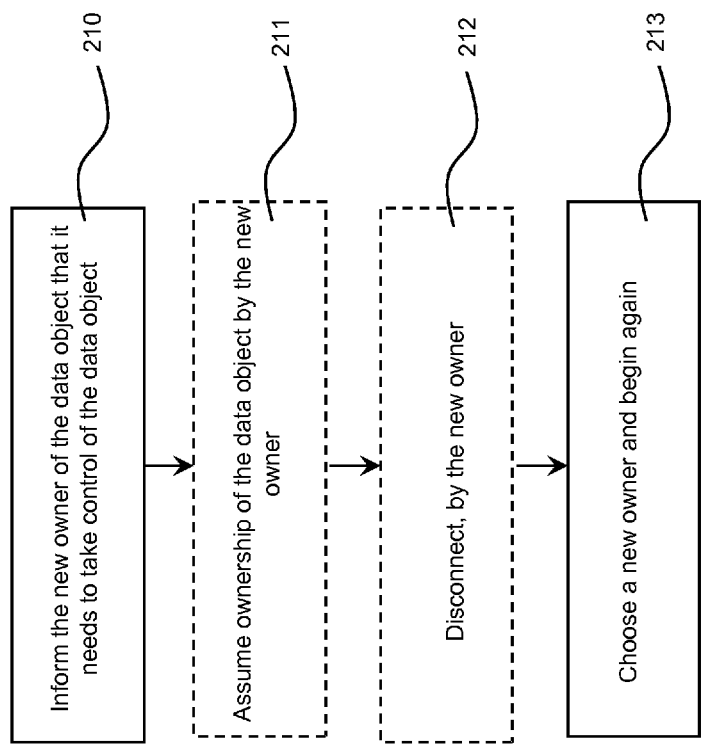
FIGS. 21 and 22 illustrate block diagrams of a process for disconnecting a remote device proposed to be the owner of a data object, in accordance with one embodiment of the disclosure.
Figure 22:
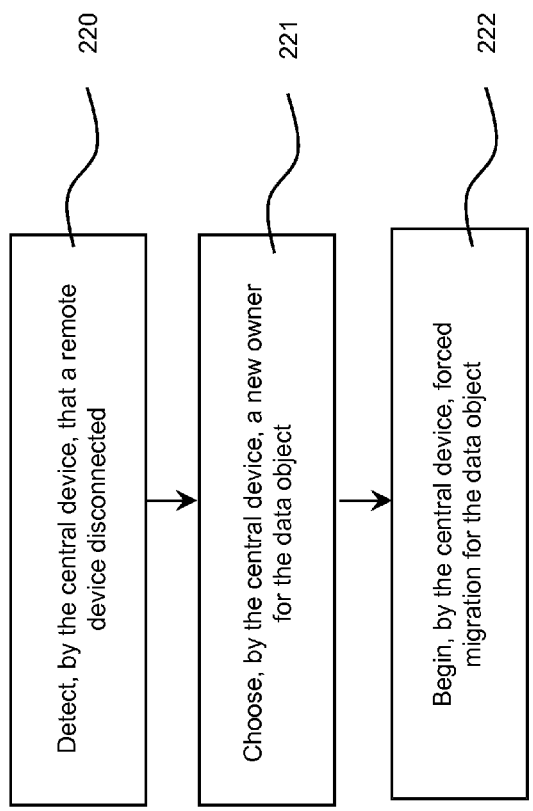

FIGS. 21 and 22 illustrate block diagrams of a process for disconnecting a remote device proposed to be the owner of a data object, in accordance with one embodiment of the disclosure. If a remote device, such as the remote device 150, being the new owner of a data object disconnects before it has responded to the assume ownership event, then the central device, e.g., the central device 110, may choose a new owner (which may be the original owner), and may send the assume ownership message again (see blocks 210-213).

Referring to FIG. 22 (blocks 220-222), when a remote device disconnects in a traditional client peer-to-peer architecture, a determination of which peer of available peers may be most suitable for assuming control of each of the data objects owned by the peer may be performed. Example criteria used to make such a determination may include, but is not limited to, the speed of a remote device's connection, the number of entities currently being controlled by the remote device, and whether the remote device detected to have been performing a suspicious, unwanted action (e.g., cheating). This may be necessary because each peer may have different information regarding the state of each of the data objects. However, depending on the state of the online game, there may be data objects that are not represented on some or any other peers. In a traditional peer-to-peer game, these data objects may be lost.

With the online game system proposed herein, the central device may maintain a cached copy of the current state of every data object by virtue of the fact that all network traffic may pass through it. When a remote device disconnects, the central device can iterate through all or a portion of the objects owned by the disconnected remote device, and migrate them to a selected remote device using its cached state. In one embodiment, such migration may be forced. This may allow remote device disconnections to be resolved relatively quickly and authoritatively.

Correct distribution of data objects amongst remote devices may be a complex task. Objects may be fairly and evenly distributed amongst the remote devices, whilst at the same time certain situations may be avoided and others may be promoted. Heuristics that determine where and when a data object is migrated may be used to accomplish such tasks, in certain embodiments.

An example migration task may be load balancing. Load balancing may describe data objects that are spread out amongst the remote devices, such as the remote devices 150, in the online game, thereby spreading the game logic burden amongst multiple nodes. A load balancing migration may be a cooperative migration.

Latency reduction may attempt to place data objects that will interact with each other on the same remote device, such as the remote device 150. This may reduce the latency in their communications, and may result in a faster, more responsive experience. The probability of two data objects interacting may be determined by the observers that are declared by the game to the system. A latency reduction migration may be a co-operative migration.

In an example online game system, all game logic may be performed on the remote devices of the system. When a remote device stops responding to messages, for example, it may be possible that the remote device is either disconnecting (e.g., gracelessly) or that network congestion is occurring. The result of this may be that, to other players, certain data objects in the online game stop responding. It may be desirable, then, to detect when a remote device stops responding, and take action as in response. One action may be to disconnect the player and redistribute the player's (device) data objects via forced migration. However, if the player (device) is merely experiencing a temporary latency increase, the disconnection could be unjustified. On the other hand, if too much time lapses before the remote device (the player) is disconnected, the other players' game experiences may be adversely impacted.

In one embodiment, when the central device detects that a player (device) is not responding in a timely manner, the central device may preemptively start migration of the client device's data objects to other, more responsive, remote devices. This may maintain the responsiveness of data objects for other remote devices by detecting the problem relatively quickly, whilst giving the connection to the remote device time to settle. Time to settle may refer to the time it takes for messages in a queue to be sent. For example, when a player experienced a disruption in communication, messages sent to the player may be queued by the network. Because queued messages may be required to be resent when a communication channel clears, an increase in latency may result. If after a relatively short time the remote device still has not responded, then the remote device may be dropped from the game. In one configuration, a remote device may be dropped from the game within about one to two seconds, or some other amount of time that may be dependent on the particular game being played. A disconnect prediction migration may be a forced migration in instances in which the remote device is not responding.

Blacklists may be used to prevent certain data objects from being migrated to certain remote devices, such as the remote devices 150. A blacklist may be a list of data objects that the central device, e.g., the central device 110, maintains for each remote device, containing the data objects that the remote device is not allowed to own. The blacklist may include, for instance, the player's (device's) avatar. Putting this data object in the blacklist of the remote device may prevent the data object from migrating to the remote device (and will in fact force it to migrate away), in certain embodiments. Such functionality may be used to prevent a remote device from gaining authoritative control over its avatar, thereby preventing cheating, in one embodiment. In one embodiment, a data object can migrate to a remote device it is blacklisted on only if it is the only remote device remaining in the game. In one example, when a data object is migrated away from a remote device due to it appearing in the blacklist of the remote device, the migration may be considered a forcible migration, in one embodiment.

The time that the data object has been owned by a remote device may be used as another heuristic. The time may be used both to prevent over migration of certain data objects (for instance, limiting a data object to only migrate once per 30 seconds or some other time interval) and to ensure that a data object is not owned by a single remote device for too long, as non-limiting examples.

A cheat index (see cheat detection below) of a remote device, such as the a remote device 150, can be used to bias how many data objects and the type of data objects a remote device is allowed to own. When a possible cheating infraction, such as a cheating attack, is detected, the data object that the infraction occurred on may be forcibly migrated away from that remote device. Additionally, as a cheat index of the remote device increases, the amount of data objects it is allowed to own relative to other remote devices may be decreased, forcing further data objects to be migrated away, in one embodiment.

Since every peer has a complete copy of the game code and has authority over at least a subset of the game data, cheating may be difficult to prevent. The online game system proposed herein defines methods of both cheat detection and prevention.

When a remote device is caught cheating, depending on the severity of the manipulation, the remote device may not be disconnected, in some embodiments. According to these embodiments, a rolling cheat index may be implemented. The rolling cheat index may decrease over time. Each time a potential cheat is detected or an indication of cheating is received, the cheat index may be incremented by an amount commensurate to the severity of the infraction. When the cheat index surpasses a given amount, for example, the remote device may be disconnected. As the cheat index of the remote device (a player's cheat index) rises, the central device, e.g., the central device 110, may preemptively move certain game data objects away from the suspected cheat or device that has participated in cheating.

One method of cheat detection may be performed via bounds and rate of change checking A network protocol may include the definition of all or a portion of values in all or a portion of data objects that can be sent over the network. The network protocol definition can optionally include bounds and rate of change information. The central device can use this information, when present, to check the incoming network data for possible cheats or indications of cheating. For instance, if a player's (device's) avatar suddenly goes from minimum to maximum health, or if his position changes by more than a given amount in a single frame, it may be inferred that the remote device is probably cheating, and take appropriate steps.

Figure 23:
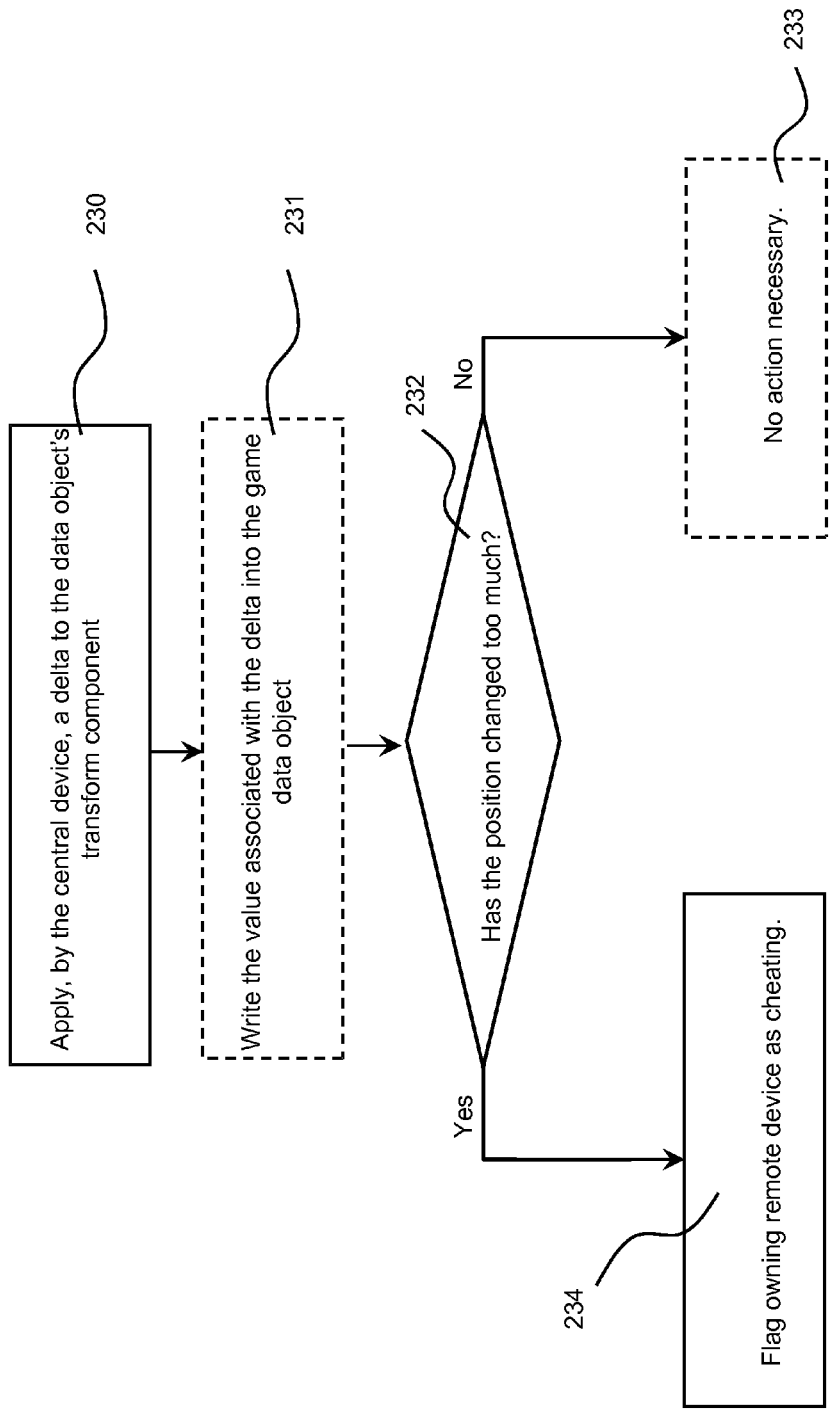
FIGS. 23 and 24 illustrate a schematic block diagram of a process for cheating prevention in the online game system, in accordance with one embodiment of the disclosure.

Another method of cheat prevention includes binding partial implementations of select game components on the central device to the network registry. This may allow the central device to track key fields and detect changes that are potentially invalid. Referring to FIG. 23, for instance, the central device, e.g., the central device 110, could bind to the Transform component in select classes. It could then monitor the position field for gross changes that might indicate a remote device performing a teleport cheat. As used herein, a teleport cheat may refer to a player acting inconsistent with allowed actions. A player may accomplish such performance of an inconsistent action by changing a value in memory associated with the player's position. In FIG. 23, the boxes with dashed lines may be code that is implemented in the bound class.

In a block 230 the central device may apply an incoming delta to the entity's transform component. Such an action may write the value into the game data object, calling Transform.SetPosition, or another function, in the game logic (block 231). In block 232, the implementation of a function to write the delta value into the game data object associated with the central device may check that the position has not changed too much. In one embodiment, a player's position may change by up to about ten (10) units per second, or for the player's health to change about 76 units per second. The player's position and/or health may change by various other permissible amounts, in other embodiments. If the position has changed significantly, then the entity's owner may be determined to be cheating, and is flagged as such (block 234), according to one embodiment. If the position has not changed significantly, then no further action may be taken (block 233).

Another example test is to bind to the component that controls an NPC's health. NPC refers to a non-player character. In this case, it is referred to any data object (including the player's avatar) that has a health property. If the health changes too much over a short period of time, the remote device can be flagged as cheating.

Figure 24:
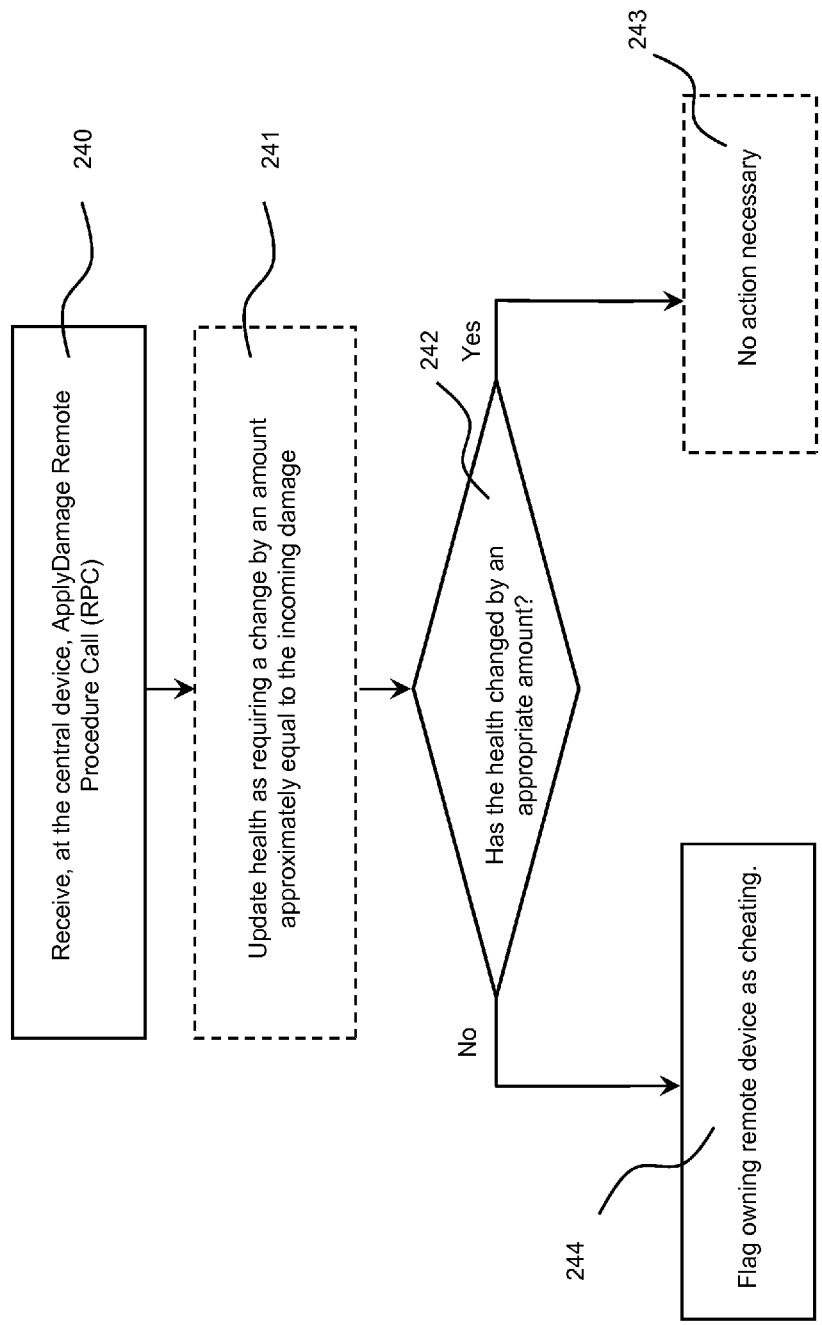

Referring to FIG. 24, similarly, the central device may bind to the RPC that applies damage to an NPC. In FIG. 24, the boxes with dashed lines are code that is implemented in the bound class.

In a block 240, the central device, e.g., the central device 110, may receive an ApplyDamage Remote Procedure Call (RPC) from a remote device, such as the remote device 150. In the implementation of ApplyDamage in the game code on the central device, the health of the NPC may be flagged as needing to change by an amount approximately equal to the incoming damage (block 241). After a short amount of time, in block 242, the health may be checked to see if it has changed by an appropriate amount. If the health has changed by an appropriate amount, no action may be necessary (block 243), in one embodiment. If the health has not changed (block 244), or has changed by an inappropriate amount, then the entity's owner may be flagged as cheating (entity's device is not responding appropriately to the ApplyDamage RPC). If soon after receiving this RPC, the NPC's health does not change by an appropriate amount, then the remote device can be assumed to have ignored the damage RPC, and can be flagged for cheating. An assumption of ignoring a damaged RPC may be made after various time durations. Such durations may depend on the network connection, in one embodiment. An example value may be sufficient time for the message to arrive at the remote device. Another example value may vary based on the severity of a cheating infraction. For example, a lag spike may allow a player to move about two units farther than usual. Being caught moving by such an amount may be a small infraction. Being caught moving about ten units farther than what is allowed, however, may be considered a more serious infraction, and therefore, an appropriate amount for this infraction time duration or amount for a cheating infraction associated with moving about ten units farther than usual may be greater than an amount associated with moving about two units farther than usual.

Object migration may be part of cheat prevention. Cheating may require access to an authoritative copy of the game data. Changes to this data may affect the behavior of a data object with respect to other data objects. The changed data can be automatically transmitted to other nodes. For instance, an example response to a cheat, or an indication that cheating has occurred, would be to change the code of the remote device to ignore all incoming damage requests.

Migration heuristics may be manipulated to prevent cheating.

By adding each player's avatar to his blacklist of the remote device, it may be ensured that the player is not authoritative over his own avatar. This change may prevent a player from making authoritative changes to his own avatar.

Also, the ownership time heuristic can be lowered to force certain data objects to migrate more frequently. This may makes it much more difficult to find a window of opportunity to hack the data associated with a given data object.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method comprising:
    providing, by a network system comprising a central device and a plurality of remote devices connected to the central device, a plurality of data objects in the network system, wherein an exchange of each data object of the plurality of data objects in the network system is limited to exchanges between the central device and one of the plurality of remote devices; and
    implementing, by the network system, a mode of operation for running an online game session in the network system, the implementing comprising:
        assigning ownership of each data object of the plurality of data objects to at least one remote device of the plurality of remote devices, the assigning comprising:
            giving the at least one remote device control over a data object assigned to the at least one remote device;
            excluding the central device and at least one other remote device of the plurality of remote devices from control over the data object; and
            migrating ownership of the data object from the at least one remote device to the at least one other remote device that was excluded from control over the data object, the migration comprising:
                detecting a disconnection of the at least one remote device from the network system;
                searching the central device for cached information about a current status of the data object, wherein the cached information comprises a copy of the data object which is updated each time the data object passes through the central device;
                giving the at least one other remote device control over the data object using the cached information about the current status of the data object; and
                excluding the central device and the at least one remote device from control over the data object.

2. The method of claim 1, wherein migrating the ownership of the data object further comprises:
    providing a request message to said at least one other remote device indicating that the at least one other remote device shall be assigned ownership of the data object; and
    responding, by the at least one other remote device, with an answer message that the at least one other remote device will take over ownership of the data object.

3. The method of claim 1, wherein migrating the ownership of the data object further comprises detecting a failure to respond to one or more messages by said at least one remote device.

4. The method of claim 1, wherein migrating the ownership of the data is performed as part of a load balancing process that balances an individual data object load for the plurality of remote devices.

5. The method of claim 1, wherein migrating the ownership of the data is performed as part of a latency optimization process reducing latency in data communication between data objects.

6. The method of claim 1, further comprising migrating ownership of another data object having online game related data communication with the data object to said at least one other remote device, wherein migrating ownership of another data object comprises:
  giving said at least one other remote device control over the another data object; and
  excluding the central device and at least the remote device from control over the another data object.

7. The method of claim 1, wherein migrating the ownership of the data object is performed by cooperative migration, wherein the cooperative migration comprises:
  requesting, by the central device, that said at least one remote device relinquish control over the data object; and
  receiving, at the central device, a response to the request from said at least one remote device, the response indicating at least one of:
    said at least one remote device agrees to relinquish control over the data object; or
    said at least one remote device declines to relinquish control over the data object.

8. The method of claim 1, wherein migrating the ownership of the data object is performed by a forced migration process comprising informing said at least one remote device of revocation of control over the data object by the central device.

9. A system comprising:
  a network system comprising one or more memory devices;
  a central device connected to the network system;
  a plurality of remote devices connected to the network system, each remote device being connected to the central device; and
  a plurality of data objects in the network system, wherein an exchange of each data object of the plurality of data objects in the network system is limited to exchanges between the central device and one of the plurality of remote devices;
  wherein the network system is configured to run an online game system, the network system further configured to implement a mode of operation, the implementation comprising:
    assigning each data object of the plurality of data objects to at least one remote device of the plurality of remote devices, the assigning comprising (i) giving control of at least one data object to the at least one remote device to which the at least one data object is assigned, and (ii) excluding the central device and at least one other remote device of the plurality of remote devices from control over the at least one data object; and
    migrating ownership of the at least one data object from the at least one remote device to the at least one other remote device that was excluded from control over the data object by (i) detecting a disconnection of the at least one remote device from the network system, (ii) searching the central device for cached information about a current status of the data object, wherein the cached information comprises a copy of the data object which is updated each time the data object passes through the central device, (iii) giving the at least one other remote device control over the at least one data object using the cached information about the current status of the data object, and (iv) excluding the central device and the at least one remote device from control over the at least one data object.

10. The system of claim 9, wherein migrating the ownership of the at least one data object further comprises:
  providing a request message to said at least one other remote device indicating that the at least one other remote device shall be assigned ownership of the at least one data object; and
  responding, by the at least one other remote device, with an answer message that the at least one other remote device will take over ownership of the at least one data object.

11. The system of claim 9, wherein migrating the ownership of the at least one data object further comprises detecting a failure to respond to one or more messages by said at least one remote device.

12. The system of claim 9, wherein migrating the ownership of the at least one data object is performed by a forced migration process comprising informing said at least one remote device of revocation of control over the at least one data object by the central device.

13. One or more non-transitory computer-readable media including a computer program for running an online game session in a network system, the network system including a central device, a plurality of remote devices connected to the central device, and a plurality of data objects in the network system, wherein an exchange of each data object of the plurality of data objects in the network system is limited to exchanges between the central device and one of the plurality of remote devices, the computer-readable medium comprising:
  means recorded on an electronic data storage medium for implementing a mode of operation;
  means recorded on the electronic data storage medium for assigning ownership of each data object of the plurality of data objects to at least one remote device of the plurality of remote devices by (i) giving the at least one remote device control over the data object that is assigned to the at least one remote device, and (ii) excluding the central device and at least one other remote device from the plurality of remote devices from control over the data object; and
  means recorded on the electronic data storage medium for migrating ownership of the data object from the at least one remote device to the at least one other remote device that was excluded from control over the data object by (i) detecting a disconnection of the at least one remote device from the network system, (ii) searching the central device for cached information about a current status of the data object, wherein the cached information comprises a copy of the data object which is updated each time the data object passes through the central device, (iii) giving the at least one other remote device control over the data object using the cached information about the current status of the data object, and (iv) excluding the central device and the at least one remote device from control over the data object.

14. The one or more computer-readable media of claim 13, wherein migrating the ownership of the data object further comprises:

providing a request message to said at least one other remote device indicating that the at least one other remote device shall be assigned ownership of the at least one data object; and responding, by the at least one other remote device, with an answer message that the at least one other remote device will take over ownership of the at least one data object.

15. The one or more computer-readable media of claim 13, wherein migrating the ownership of the data object further comprises detecting a failure to respond to one or more messages by said at least one remote device.

16. The one or more computer-readable media of claim 13, wherein migrating the ownership of the data object is performed by a forced migration process comprising informing said at least one remote device of revocation of control over the data object by the central device.

* * * * *